(12) United States Patent
Fukumoto et al.

(10) Patent No.: US 6,798,527 B2
(45) Date of Patent: Sep. 28, 2004

(54) THREE-DIMENSIONAL SHAPE-MEASURING SYSTEM

(75) Inventors: Tadashi Fukumoto, Ibaraki (JP); Shigeru Osaki, Yamatokouriyama (JP); Masahiro Ariizumi, Osaka (JP); Norio Matsunaga, Takaishi (JP); Yoshihisa Abe, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/128,523

(22) Filed: Apr. 24, 2002

(65) Prior Publication Data
US 2002/0171847 A1 Nov. 21, 2002

(30) Foreign Application Priority Data

Apr. 27, 2001 (JP) ..... P2001-132305
Apr. 27, 2001 (JP) ..... P2001-132307

(51) Int. Cl.[7] ............................................. G01B 11/24
(52) U.S. Cl. ..................... 356/602; 356/623; 356/243.4
(58) Field of Search ........................... 356/243.1–243.8, 356/601–624

(56) References Cited

U.S. PATENT DOCUMENTS

| | | | | |
|---|---|---|---|---|
| 4,611,292 A | * | 9/1986 | Ninomiya et al. | 702/153 |
| 4,731,853 A | * | 3/1988 | Hata et al. | 382/153 |
| 4,925,308 A | * | 5/1990 | Stern et al. | 356/614 |
| 4,978,224 A | * | 12/1990 | Kishimoto et al. | 356/394 |
| 5,076,697 A | * | 12/1991 | Takagi et al. | 356/603 |
| 5,085,502 A | * | 2/1992 | Womack et al. | 356/605 |
| 5,461,478 A | * | 10/1995 | Sakakibara et al. | 356/623 |
| 5,506,683 A | * | 4/1996 | Yang et al. | 356/606 |
| 5,848,188 A | * | 12/1998 | Shibata et al. | 382/203 |

FOREIGN PATENT DOCUMENTS

| | | |
|---|---|---|
| JP | 6-347227 | 12/1994 |
| JP | 7-294223 | 11/1995 |

* cited by examiner

*Primary Examiner*—Hoa Q. Pham
(74) *Attorney, Agent, or Firm*—McDermott Will & Emery LLP

(57) ABSTRACT

An object of the present invention is to provide a method for accurately measuring a three-dimensional shape of a measuring subject independent of the surface shape of the measuring subject, and another object thereof is to shorten the time from the measurements of the measuring subject until three-dimensional shape data is obtained so as to carry out efficient measuring operations. In a three-dimensional measuring system 1 that measures a three-dimensional shape of a measuring subject, two three-dimensional measuring devices 10, 20 are placed. The three-dimensional measuring device 10 measures a measuring subject placed in a measuring space 3 by allowing a laser slit light L1 in a longitudinal direction to scan in a lateral direction. Moreover, the three-dimensional measuring device 20 measures the measuring subject placed in a measuring space 3 by allowing the laser slit light L1 in a lateral direction to scan in a longitudinal direction.

12 Claims, 21 Drawing Sheets

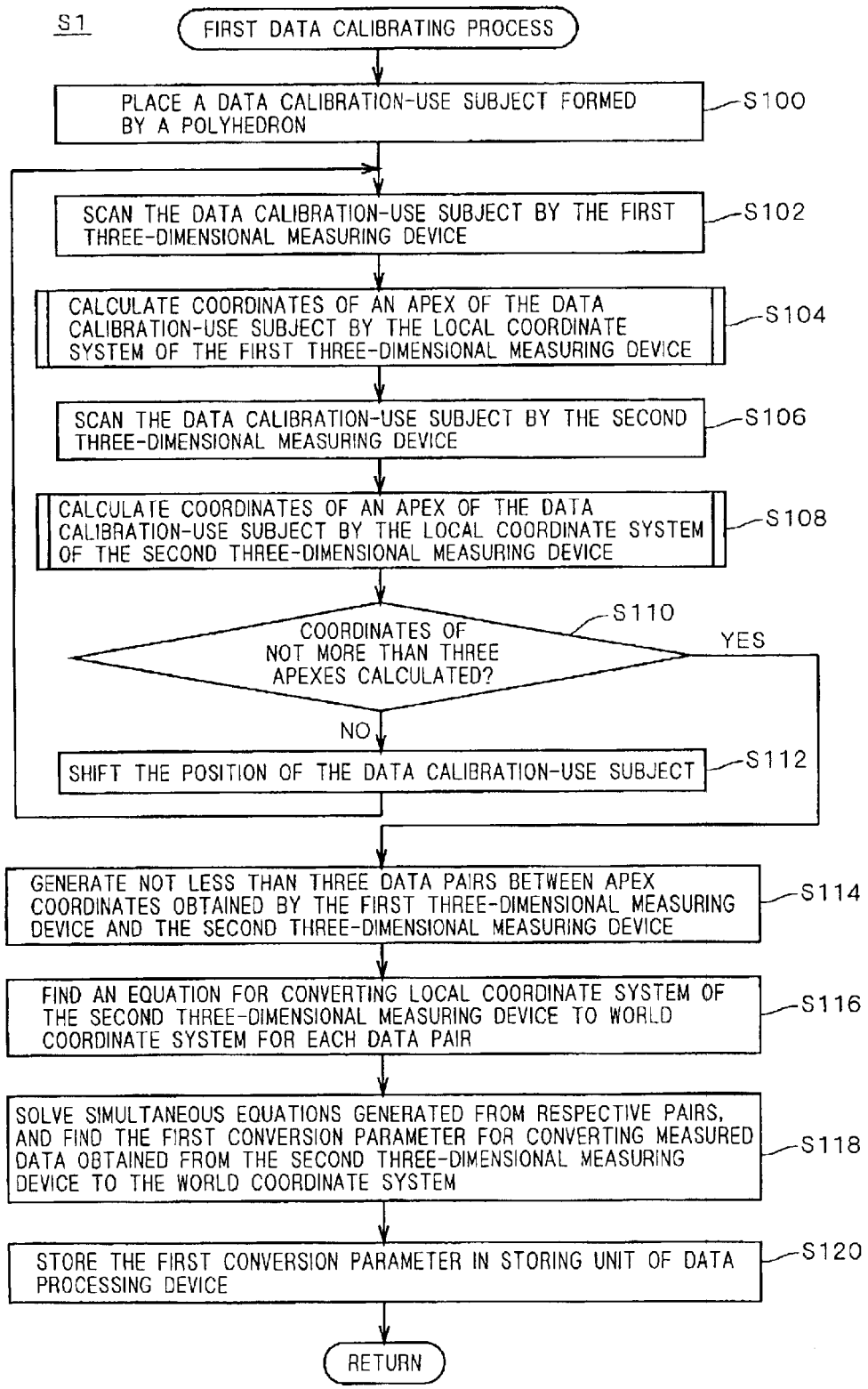

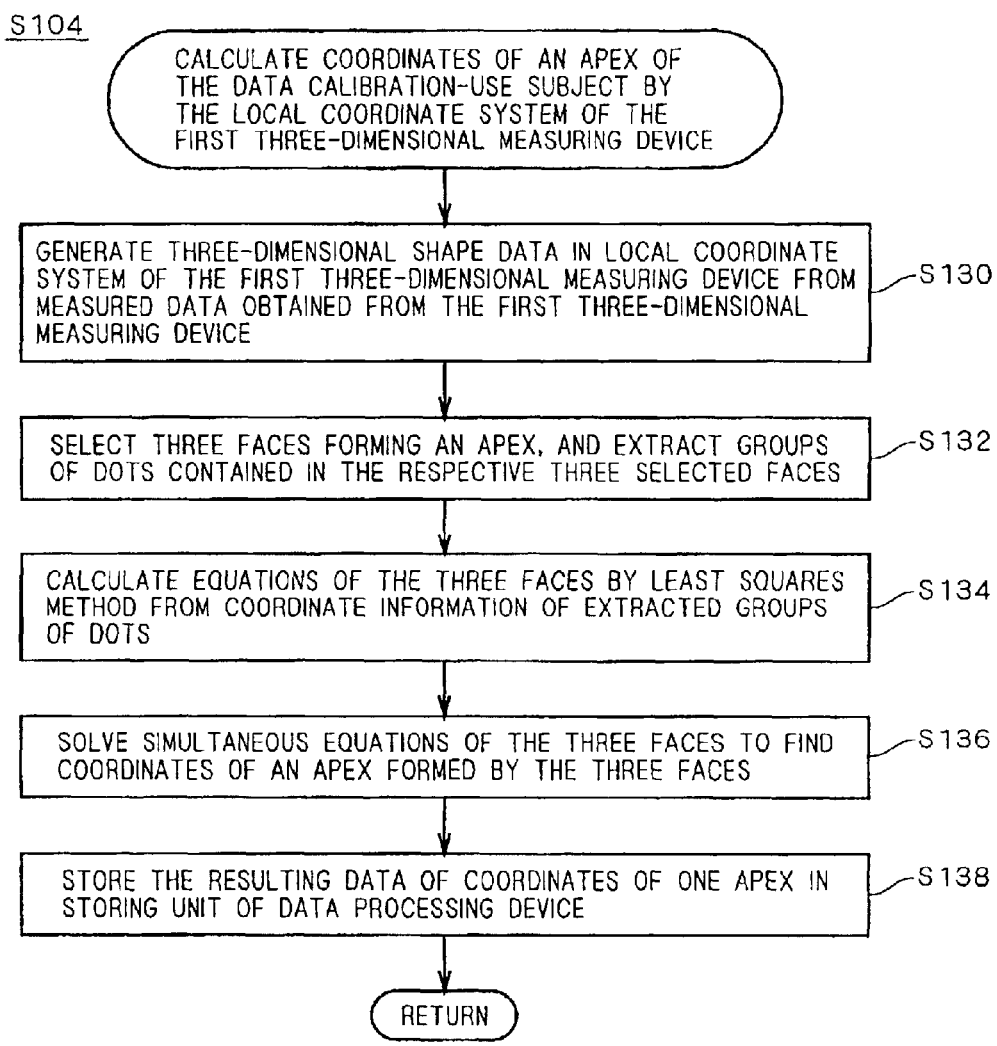

( CALCULATE COORDINATES OF AN APEX OF THE DATA CALIBRATION-USE SUBJECT BY THE LOCAL COORDINATE SYSTEM OF THE SECOND THREE-DIMENSIONAL MEASURING DEVICE )

GENERATE THREE-DIMENSIONAL SHAPE DATA IN LOCAL COORDINATE SYSTEM OF THE SECOND THREE-DIMENSIONAL MEASURING DEVICE FROM MEASURED DATA OBTAINED FROM THE SECOND THREE-DIMENSIONAL MEASURING DEVICE — S140

SELECT THREE FACES FORMING AN APEX, AND EXTRACT GROUPS OF DOTS CONTAINED IN THE RESPECTIVE THREE SELECTED FACES — S142

CALCULATE EQUATIONS OF THE THREE FACES BY LEAST SQUARES METHOD FROM COORDINATE INFORMATION OF EXTRACTED GROUPS OF DOTS — S144

SOLVE SIMULTANEOUS EQUATIONS OF THE THREE FACES TO FIND COORDINATES OF AN APEX FORMED BY THE THREE FACES — S146

STORE THE RESULTING DATA OF COORDINATES OF ONE APEX IN STORING UNIT OF DATA PROCESSING DEVICE — S148

( RETURN )

THREE-DIMENSIONAL SHAPE-MEASURING SYSTEM

This application is based on application Nos. 2001-132305 and 2001-132307 filed in Japan, the contents of which are hereby incorporated by reference.

BACKGROUND OF THE INVENTION

1. Field of the Invention

The present invention relates to a three-dimensional shape-measuring system which measures a three-dimensional shape of a measuring subject.

2. Description of the Background Art

Conventionally, a three-dimensional shape-measuring system which measures a three-dimensional shape of a measuring subject by a light section method utilizing laser light has been known. In the conventional three-dimensional shape measuring system, laser slit light having a slit shape is directed to a measuring subject from a light-projecting unit, and the laser slit light is allowed to scan in a direction orthogonal to a slit direction, that is, a direction in which light components are distributed in a cross-section of a luminous flux of the laser slit light, so that reflected light from the measuring subject is detected. Then, based upon the reflected light components, a three-dimensional shape of the measuring subject on the plane facing the light-projecting unit.

However, the problem with the conventional three-dimensional shape-measuring system is that, in the case when a measuring subject has a complicated surface shape such as grooves, projected light from the light-projecting unit is not directed thereto appropriately, causing shadows on the corresponding portions and failing to carry out an appropriate shape-measuring process.

In order to solve this problem, for example, the groove portion may be shifted to a position in front of the light-projecting unit so as to project the laser slit light onto the groove portion properly; however, in order to shift the measuring subject, a shifting mechanism for accurately shifting the measuring subject needs to be installed in a separated manner. Moreover, it is difficult to shift the measuring subject accurately.

SUMMARY OF THE INVENTION

The present invention relates to a three-dimensional shape-measuring system.

According to one aspect of the present invention, a three-dimensional shape-measuring system, which measures a three-dimensional shape of a measuring subject by using a light section method, is provided with the followings: a first light projector which directs first laser light to the measuring subject so that the first laser light is allowed to scan the surface of the measuring subject in a first direction; a second light projector which directs second laser light to the measuring subject so that the second laser light is allowed to scan the surface of the measuring subject in a second direction different from the first direction; a light receiver which receives first reflected light derived from the first laser light reflected from the measuring subject and second reflected light derived from the second laser light reflected from the measuring subject; and a calculator which calculates a three-dimensional shape of the measuring subject based upon data obtained from the light receiver.

In accordance with the three-dimensional measuring system of this aspect, the first light projector directs first laser light to the measuring subject so that the directed first laser light is allowed to scan the surface of the measuring subject in a first direction, and the second light projector directs second laser light to the measuring subject so that the directed second laser light is allowed to scan the surface of the measuring subject in a second direction different from the first direction; therefore, since the scanning direction of the first laser light and the scanning direction of the second laser light are different from each other, it becomes possible to reduce shadowed portions appearing on the measuring subject, and consequently to accurately measure a three-dimensional shape of the measuring subject.

Moreover, according to another aspect of the present invention, a three-dimensional shape-measuring system, which measures a three-dimensional shape of a measuring subject by using a light section method, is provided with the followings: a first light projector which directs first laser light to the measuring subject so as to allow the first laser light to scan the surface of the measuring subject; a second light projector which directs second laser light to the measuring subject so as to allow the second laser light to scan the surface of the measuring subject; a light receiver which receives first reflected light derived from the first laser light reflected from the measuring subject and second reflected light derived from the second laser light reflected from the measuring subject; and a calculator which calculates a three-dimensional shape of the measuring subject based upon data obtained from the light receiver.

In accordance with the three-dimensional shape-measuring system, since the direction of the first base length connecting the first light projector and the light receiver and the direction of the second base length connecting the second light projector and the light receiver are set in non-parallel with each other, it becomes possible to reduce shadowed portions appearing on the measuring subject, and consequently to accurately measure a three-dimensional shape of the measuring subject.

According to still another aspect of the present invention, a three-dimensional shape-measuring system, which directs laser light to a measuring subject placed in a measuring space from a plurality of directions by using a light projector so that a light receiver detects reflected light derived from the laser light from the light projector reflected by the measuring subject to generate a three-dimensional shape data of the measuring subject, is provided with the followings: a controller which, prior to measurements on the measuring subject, controls the light projector and light receiver so as to measure a calibration-use subject placed in the measuring space from the plurality of directions; a data processor which finds a conversion parameter used for converting measured data related to the calibration-use subject, obtained respectively in the plurality of directions, to three-dimensional shape data in a world coordinate system; and a memory storing the conversion parameter.

In accordance with the three-dimensional shape-measuring system of this aspect, prior to measurements on the measuring subject, a calibration-use subject placed in the measuring space is measured from the plurality of directions, and a conversion parameter, which is used for converting measured data related to the calibration-use subject, obtained respectively in the plurality of directions, to three-dimensional shape data in a world coordinate system, is obtained. Then, upon measuring the measuring subject, the measured data related to the calibration-use subject, obtained respectively in the plurality of directions, is data-converted by using the conversion parameter that has been preliminarily found, to generate three-dimensional shape data; therefore, it is possible to shorten the time from measurements on the measuring subject until three-dimensional shape data is found, and consequently to carry out the measuring operation efficiently.

Here, the present invention is also directed to a three-dimensional shape-measuring method which directs laser light to a measuring subject placed in a measuring space from a plurality of directions by using a light projector so that a light receiver detects reflected light derived from the laser light from the light projector reflected by the measuring subject to generate a three-dimensional shape data of the measuring subject.

According to the other aspect of the present invention, a three-dimensional shape-measuring method is provided with the following steps: a step of placing a calibration-use subject in the measuring space prior to measurements on the measuring subject; a step of measuring the calibration-use subject in the plurality of directions; a step of finding a conversion parameter used for converting measured data related to the calibration-use subject, obtained respectively in the plurality of directions, to three-dimensional shape data in a world coordinate system; storing the conversion parameter; and a step of, upon measuring the measuring subject, generating the three-dimensional shape data by data-converting the measured data related to the calibration-use subject, obtained respectively in the plurality of directions, by the use of the conversion parameter.

In accordance with the three-dimensional shape-measuring method of this aspect, prior to measurements on the measuring subject, the calibration-use subject placed in the measuring space is measured in the plurality of directions so that a conversion parameter, which is used for converting measured data related to the calibration-use subject, obtained respectively in the plurality of directions, to three-dimensional shape data in a world coordinate system, is found. Then, upon measuring the measuring subject, the three-dimensional shape data is generated by data-converting the measured data related to the calibration-use subject, obtained respectively in the plurality of directions, by the use of the conversion parameter that has been preliminarily found; therefore, it is possible to shorten the time from measurements on the measuring subject until three-dimensional shape data is found, and consequently to carry out the measuring operation efficiently.

The present invention has been devised to solve the above-mentioned problems, and an object thereof is to provide a three-dimensional shape-measuring system which can measure a three-dimensional shape of a measuring subject accurately independent of the surface shape thereof.

Moreover, another object of the present invention is to provide a three-dimensional shape-measuring system and a three-dimensional shape-measuring method which can shorten the time from measurements on the measuring subject until three-dimensional shape data is found to carry out the measuring operation efficiently.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flow chart showing the first data calibrating process in detail;

FIG. 13 is a flow chart showing a process in step S104 in detail;

FIG. 14 is a flow chart showing a process in step S108 in detail;

DESCRIPTION OF THE PREFERRED EMBODIMENTS

Referring to drawings, the following description will discuss preferred embodiments of the present invention in detail.

1. Three-dimensional Shape-measuring System

Figure 1:
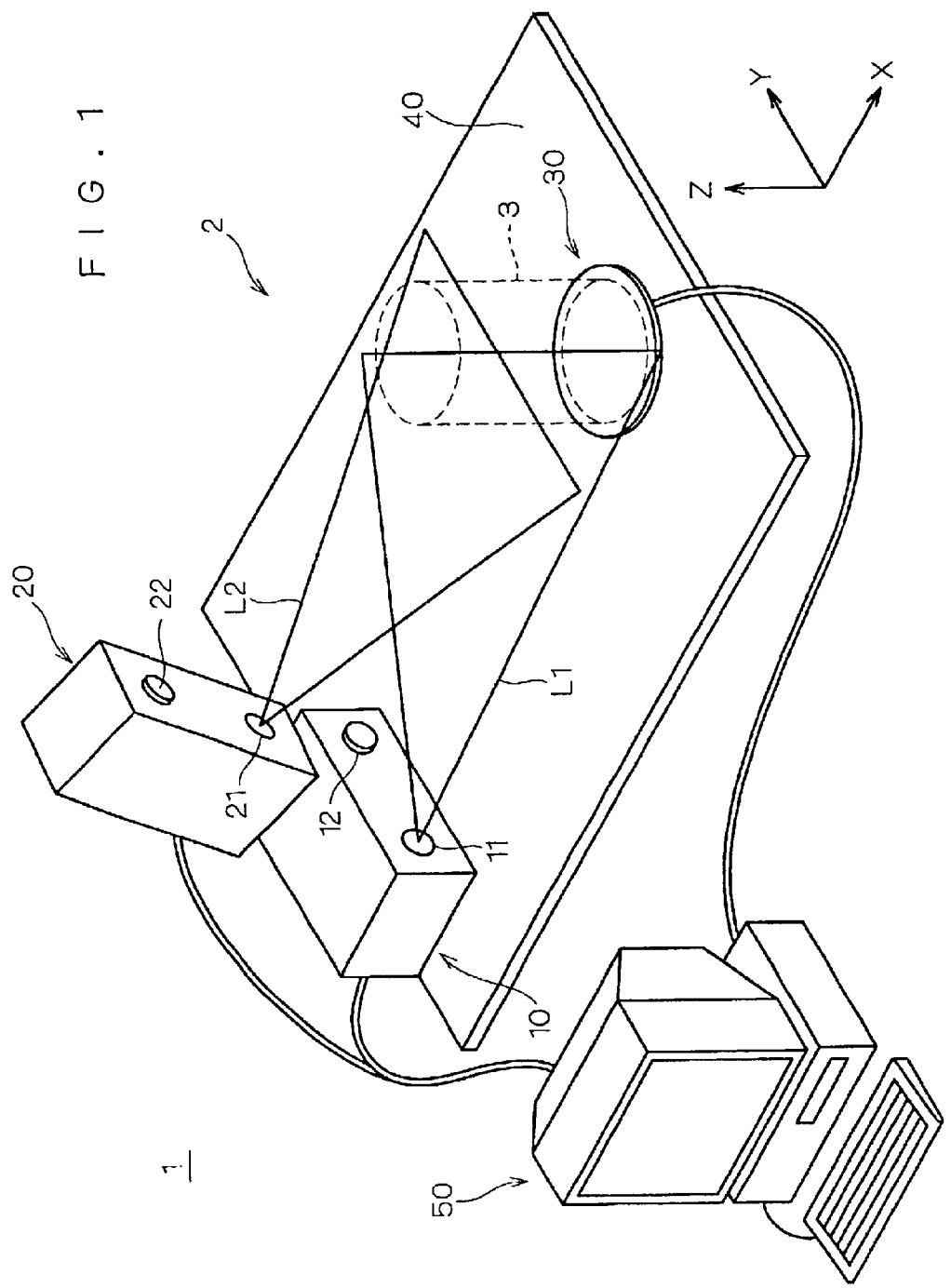
FIG. 1 is a perspective view showing a schematic structure of a three-dimensional shape-measuring system in accordance with an embodiment of the present invention.

FIG. 1 is a perspective view that shows a schematic structure of a three-dimensional shape-measuring system 1 in accordance with the present preferred embodiment. As shown in FIG. 1, this three-dimensional shape-measuring system 1 is provided with a measuring device 2 constituted by a first three-dimensional measuring device 10 and a second three-dimensional measuring device 20 and a rotation stage 30 that are placed on a base 40, and a data processing device 50 that controls two three-dimensional measuring devices 10, 20 and rotation stage 30, and processes measured data obtained from the respective three-dimensional measuring devices 10, 20. Here, a fixing member for securing three-dimensional measuring devices 10, 20 to base 40 is omitted from FIG. 1.

Two three-dimensional measuring devices 10 and 20, included in the measuring device 2, have the same construction respectively, and they may be switched in their installation places. Rotation stage 30 is used for allowing a measuring subject having an arbitrary three-dimensional shape to be placed thereon, and has its rotation operation and rotation angle controlled by data processing device 50.

Figure 2:
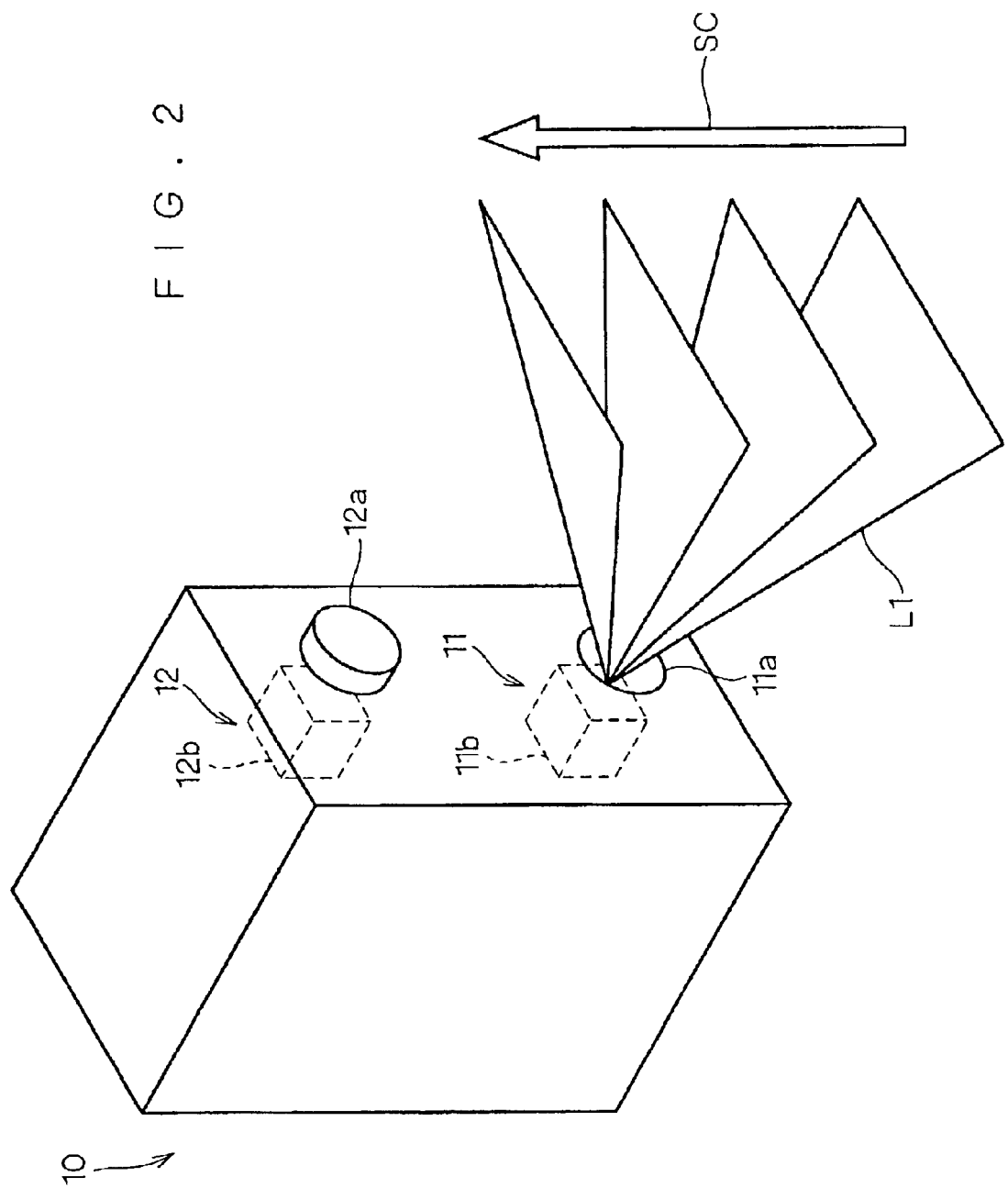
FIG. 2 is a perspective view showing a three-dimensional measuring device.

First, the following description will explain three-dimensional measuring devices 10, 20. FIG. 2 is a perspective view that shows three-dimensional measuring device 10. As shown in FIG. 2, a light-projecting unit 11 and a light-receiving unit 12 are placed on the front face side of three-dimensional measuring device 10. Light-projecting unit 11 is provided with a light-projecting window 11a and a scanning optical system 11b, and scanning optical system 11b converts laser light from a laser light source to a laser light beam (hereinafter, referred to as "laser slit light") L1 which has a slit-shaped beam cross-section (linear shape), and laser slit light L1 is scanned in a predetermined scanning direction SC by using a scanning means. Here, a galvano-mirror is employed. FIG. 2 shows a state in which light components of laser slit light L1 projected by light-projecting unit 11 is distributed in the horizontal direction, that is, a state in which the slit direction of laser slit light L1 is set to the horizontal direction, and scanning direction SC of a scanning optical system 11b is set so that laser slit light L1 is scanned in the vertical direction, that is, in the direction orthogonal to the slit direction.

Moreover, light-receiving unit 12 is provided with a light-receiving window 12a and a light-receiving optical system 12b, and is arranged so that reflected light derived from laser slit light L1 directed from light-projecting unit 11 and reflected from the measuring subject is received by light-receiving optical system 12b through light-receiving window 12a. Here, CCD image-pickup elements are arranged in light-receiving optical system 12b as light-receiving elements, and light-receiving optical system 12b is controlled in synchronism with scanning optical system 11b in light-projecting unit 11 so that it is possible to obtain measured data corresponding to the scanning position of laser slit light L1.

Light-projecting unit 11 and light-receiving unit 12 are placed with a predetermined base length in between, and the direction of the base length is set so as to coincide with the scanning direction SC of laser slit light L1. With this arrangement, based upon the scanning position (irradiation position) of laser slit light L1 and the position of the reflected light received by CCD image-pickup element, measured data related to the surface shape of the measuring subject are obtained through the principle of trigonometrical survey.

Here, on the rear-surface side of three-dimensional measuring device 10, an interface for connecting cables to data processing device 50, an operation panel through which various settings are carried out on three-dimensional measuring device 10, a display unit for displaying the measured results, etc. are installed. Here, FIG. 2 has explained first three-dimensional measuring device 10, and second three-dimensional measuring device 20 also has the same structure.

In FIG. 1, again, in measuring device 2 of three-dimensional shape-measuring system 1, the above-mentioned three-dimensional measuring devices 10, 20 are arranged so that the directions of the respective base lengths are set to be virtually orthogonal to each other. In the first three-dimensional measuring device 10, the direction of the base length between light-projecting unit 11 and light-receiving unit 12 is set to the horizontal direction (Y-direction), and in the second three-dimensional measuring device 20, the direction of the base length between light-projecting unit 21 and the light-receiving unit 22 is set to a direction that is slightly tilted from the vertical direction (Z-direction) toward the side on which rotation stage 30 is placed. In other words, the base length direction of second three-dimensional measuring device 20 is contained in the XZ plane that is orthogonal to the Y-direction.

Here, the positions of light-receiving units 12, 22 of the respective three-dimensional measuring devices 10, 20 are set at front positions of the rotation stage 30 (more specifically, positions included in the XZ plane passing through the center of the rotation stage 30).

Further, laser slit light L1 projected from the first three-dimensional measuring device 10 has its slit direction set in parallel with the Z-direction, and is scanned in the Y-direction so that laser slit light L1 is directed to all the area of measuring space 3 on rotation stage 30. Moreover, laser slit light L2 projected from the second three-dimensional measuring device 20 has its slit direction set in parallel with the Y-direction, and is scanned in the Z-direction so that laser slit light L2 is directed to all the area of measuring space 3 on rotation stage 30.

Figure 3:
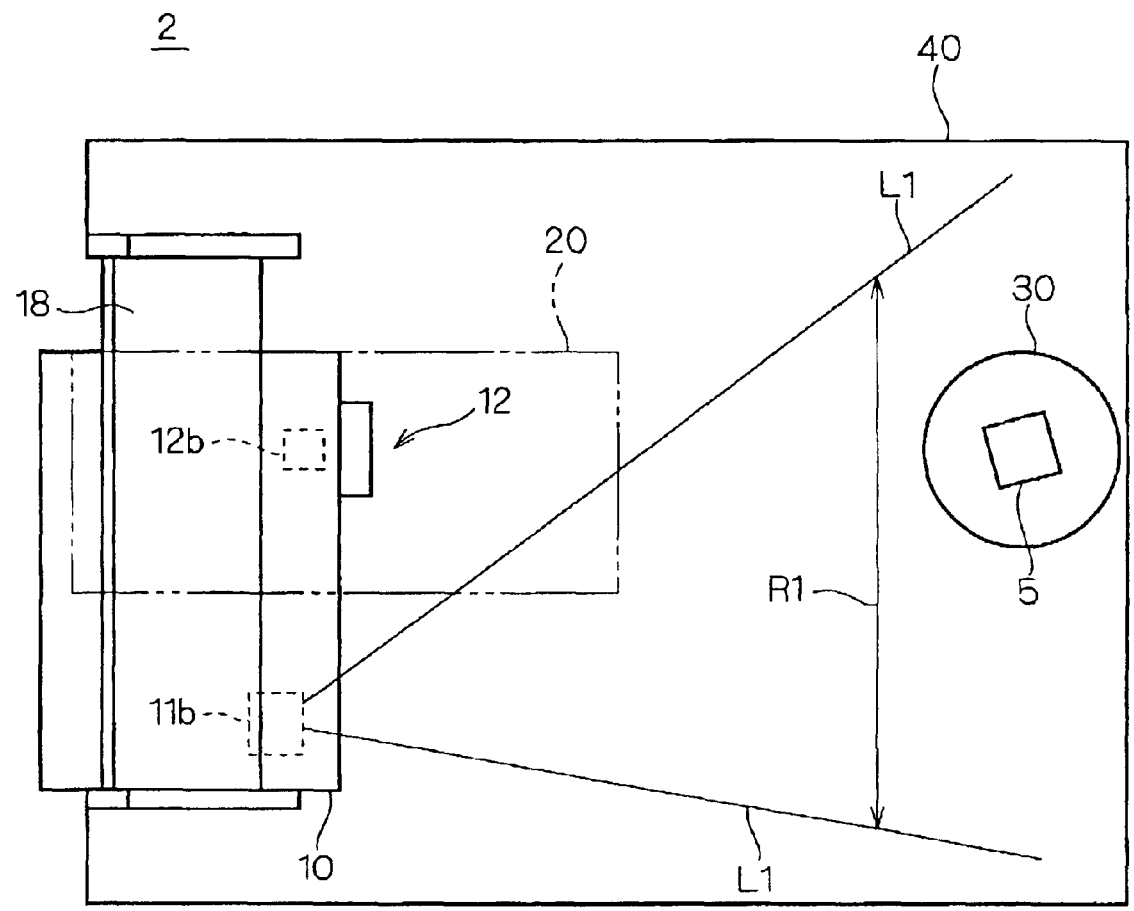
FIG. 3 is a view showing a state in which the three-dimensional measuring device measures a measuring subject.
Figure 4:
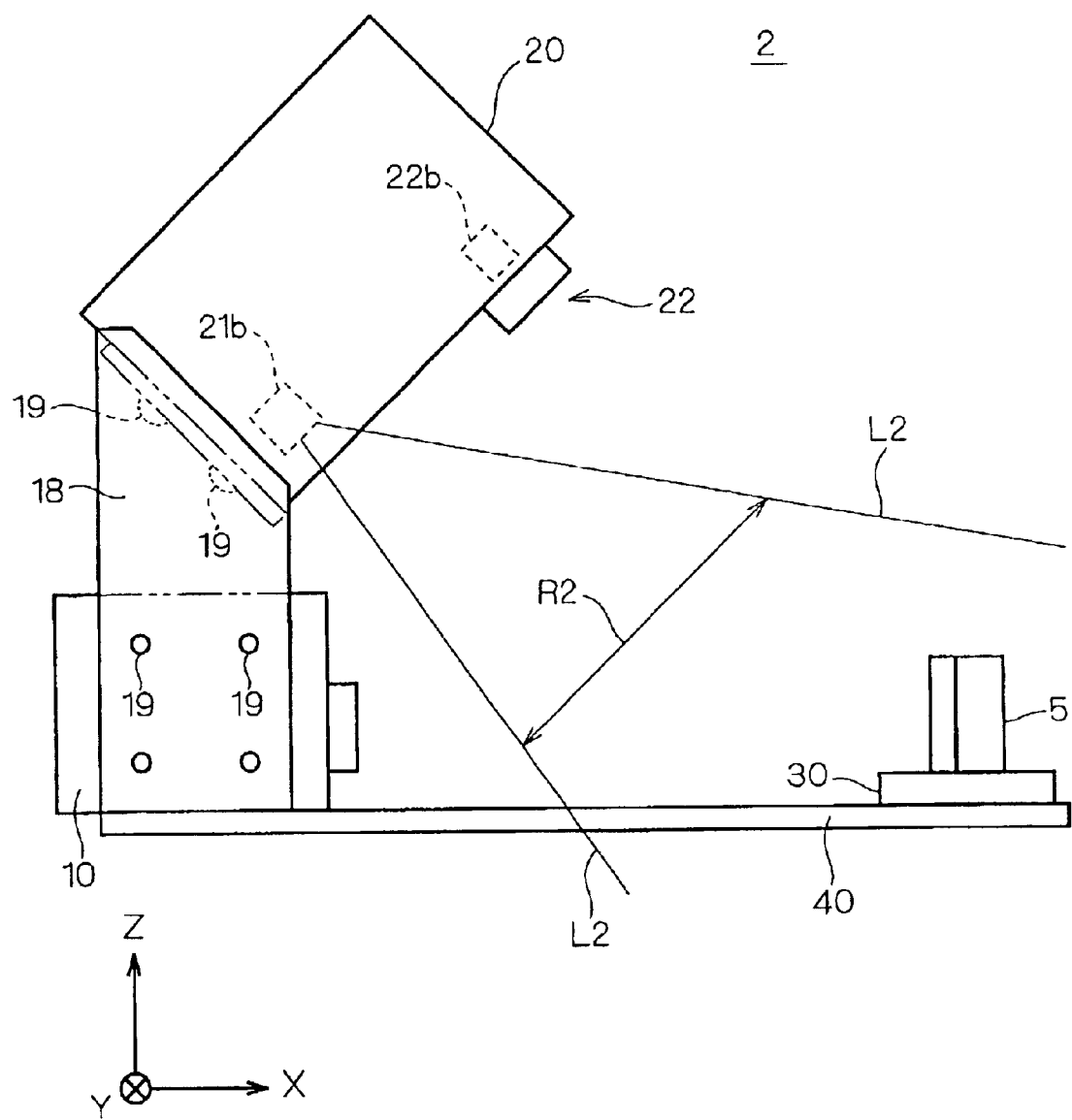
FIG. 4 is a view showing a state in which the three-dimensional measuring device measures a measuring subject.

FIGS. 3 and 4 are views that show states in which the first and second three-dimensional measuring devices 10, 20 respectively measure measuring subject 5; and FIG. 3 is a view that shows measuring device 2 viewed from above, and indicates the scanning range of laser slit light L1 by the first three-dimensional measuring device 10, and FIG. 4 is a view that shows measuring device 2 viewed laterally, and indicates the scanning range of laser slit light L2 by the second three-dimensional measuring device 20. As shown in FIG. 3 and FIG. 4, the first and second three-dimensional measuring devices 10, 20 are secured to a fixing member 18 placed on base 40 with screws 19 so that they are fixed with a predetermined positional relationship.

First, as shown in FIG. 3, scanning optical system 11b of the first three-dimensional measuring device 10 allows laser slit light L1 to scan within a scanning range R1. In this scanning range R1, in order to allow laser slit light L1 to execute a constant-angular-velocity scanning operation with a predetermined angular velocity, the galvano-mirror is controlled to carry out an initial movement (an accelerating movement carried out up to a predetermined angular velocity) prior to directing laser slit light L1 to scanning range R1, to move at a constant angular velocity while laser slit light L1 is scanning scanning range R1, and also to move by inertia (an accelerating movement for stopping) after laser slit light L1 has passed through scanning range R1.

Within scanning range R1, laser slit light L1 is reflected from the surface of measuring subject 5 on rotation stage 30. The reflected light is received by light-receiving optical system 12b of light-receiving unit 12 and converted to an electronic signal (measured data) in accordance with the surface shape of measuring subject 5. In three-dimensional measuring device 10, measured data can be obtained when laser slit light L1 is once allowed to scan within scanning range R1, and based upon the measured data, three dimensional coordinates of measuring subject 5 are found in the local coordinate systems in three-dimensional measuring device 10.

Upon completion of the measurements in the first three-dimensional measuring device 10, as shown in FIG. 4, scanning optical system 21b of the second three-dimensional measuring device 20 allows laser slit light L2 to scan within a scanning range R2. In the same manner as the above-mentioned operation, in this case also, the galvano-mirror is controlled to carry out an initial movement prior to directing laser slit light L2 to scanning range R2, to move at a constant angular velocity while laser slit light L2 is scanning within scanning range R2, and also to move by inertia after laser slit light L2 has passed through scanning range R2.

This laser slit light L2 is also reflected by the surface of measuring subject 5 on rotation stage 30 within scanning range R2. The reflected light is received by light-receiving optical system 22b of light-receiving unit 22, and converted to an electronic signal (measured data) in accordance with the surface shape of measuring subject 5. In three-dimensional measuring device 20 also, measured data can be obtained when laser slit light L2 is once allowed to scan within scanning range R2, and based upon the measured data, three dimensional coordinates of measuring subject 5 are found in the local coordinate systems in three-dimensional measuring device 20.

By again carrying out measurements by the three-dimensional measuring devices 10, 20 while rotating the rotation stage 30, the measuring subject 5 is also measured on its rear face side, and by repeatedly carrying out the rotation of the rotation stage 30 and the measuring operations of the three-dimensional measuring devices 10, 20, it becomes possible to measure the three-dimensional shape around the entire circumference of the measuring subject 5.

Figure 5:
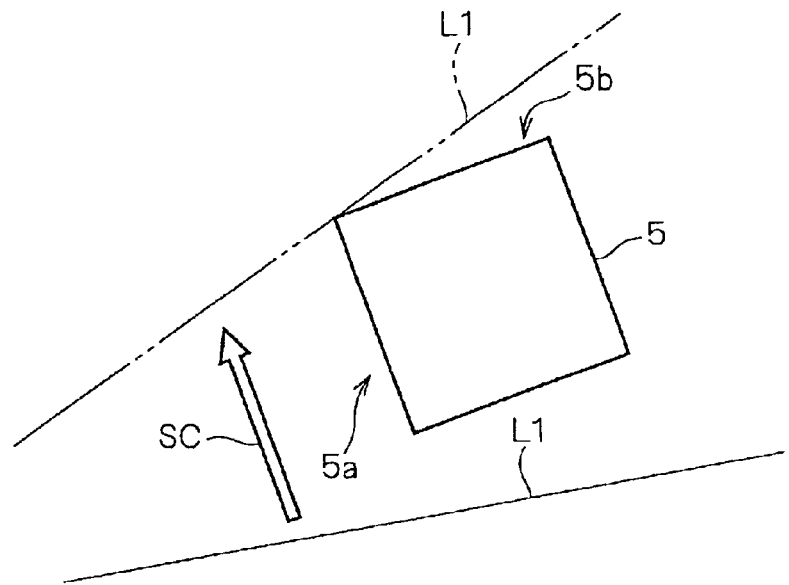
FIG. 5 is a view showing the relationship between the measuring subject and laser slit light.
Figure 6:
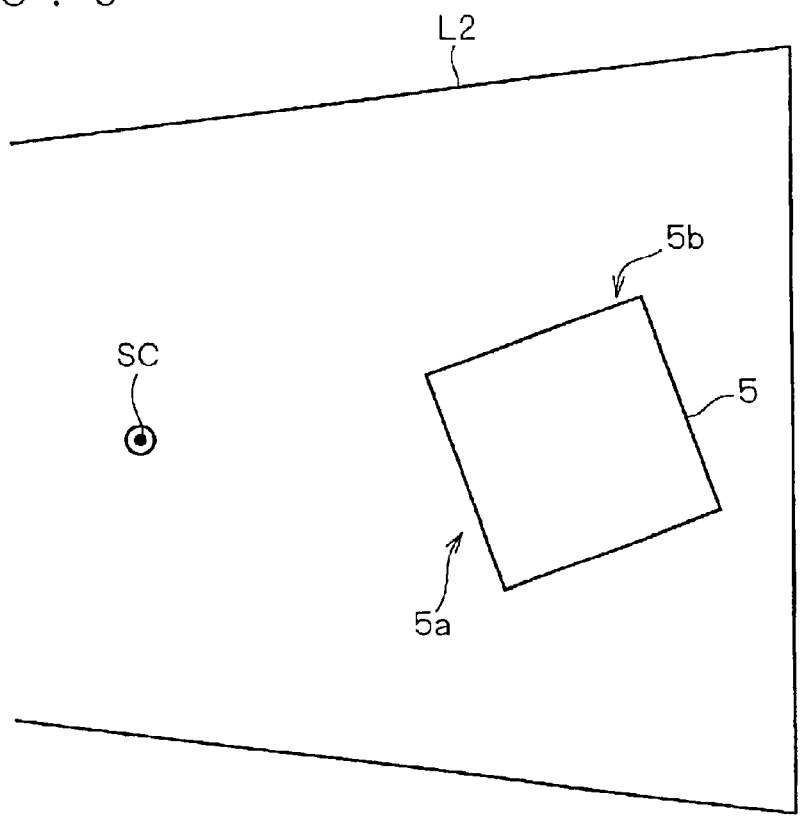
FIG. 6 is a view showing the relationship between the measuring subject and laser slit light.

Here, the following description will discuss the positional relationship between the three-dimensional measuring devices 10, 20. FIGS. 5 and 6 are views that show the relationship between the measuring subject 5 and a laser slit light when the measuring subject 5 having a rectangular parallelepiped shape is measured, and show measuring subject 5 placed on the rotation stage 30 viewed from above.

First, as shown in FIG. 5, in the case when laser slit light L1 is directed from the light-projecting unit 11 of the first three-dimensional measuring device 10 to the measuring subject 5, and allowed to scan, although the laser slit light L1 is properly directed onto a surface 5a of the measuring subject 5, the laser slit light L1 is not directed to a surface 5b, with the result that it is not possible for the first three-dimensional measuring device 10 to measure the shape of the face 5b. Although both of surfaces 5a, 5b are located within the viewing field of the light-receiving unit 12, it is not possible to measure the shape of the surface 5b; this is because the surface 5b is located behind the surface 5a from the light-projecting unit 11 since the light-projecting unit 11 is placed at a position apart from the light-receiving unit 12 by a predetermined base length.

Next, as shown in FIG. 6, in the case when the laser slit light L2 is projected from the light-projecting unit 21 of the second three-dimensional measuring device 20 so as to scan the measuring subject 5, it is possible to direct the laser slit light L2 properly onto the face 5a of the measuring subject 5, and also to direct the laser slit light L2 properly onto the face 5b so that both of the shapes of the faces 5a, 5b can be measured by the second three-dimensional measuring device 10.

In other words, as described above, by setting the respective base length directions of the three-dimensional measuring devices 10, 20 in different directions (that is, in a non-parallel state) and directing the laser slit lights L1, L2 from different directions to the measuring subject 5, it becomes possible to decrease a portion that forms a shadowed portion at the time of measuring the three-dimensional shape, and consequently to obtain good measured data without the necessity of shifting the measuring subject 5. Here, by arranging the directions of base lengths to be virtually orthogonal to each other, it becomes possible to minimize the portion that forms a shadowed portion at the time of measuring the three dimensional shape.

Moreover, by arranging the scanning directions SC of the respective three-dimensional measuring devices 10, 20 to be orthogonal to each other, it becomes possible to obtain good measured data even when the measuring subject 5 has a surface shape that would be difficult to detect by using a scanning process only in the same direction.

Figure 7:
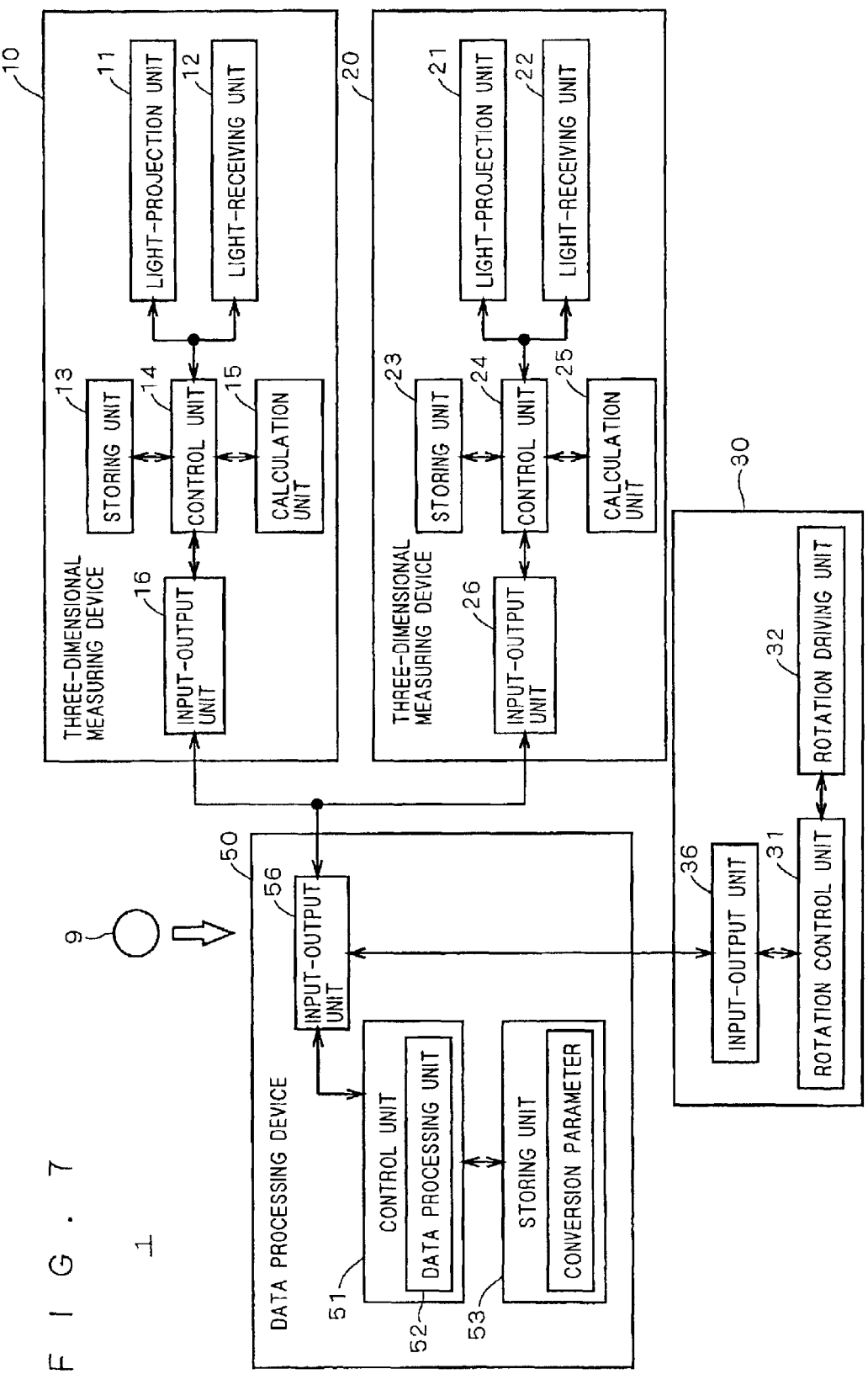
FIG. 7 is a block diagram showing an inner structure of the three-dimensional shape-measuring system.

FIG. 7 is a block diagram that shows an inner structure of the three-dimensional shape-measuring system 1.

In addition to the above-mentioned light-projecting unit 11 and light-receiving unit 12, the first three-dimensional measuring device 10 is provided with a storing unit 13 such as a memory for storing data, a control unit 14 for controlling the entire operation of the three-dimensional measuring device 10, a calculation unit 15 for finding measured data representing the shape of the measuring subject based upon the detection results in the light-receiving unit 12, and an input-output unit 16 for inputting and outputting data to and from the data processing device 50. Here, the measured data, generated in the three-dimensional measuring device 10, are also allowed to include information relating to the measuring magnification that has been set at the time of carrying out the measuring operation, and the data processing device 50 is allowed to carry out a data processing operation in which the measuring magnification is taken into consideration.

In the same manner, in addition to the above-mentioned light-projecting unit 21 and light-receiving unit 22, the second three-dimensional measuring device 20 is also provided with a storing unit 23 such as a memory for storing data, a control unit 24 for controlling the entire operation of the three-dimensional measuring device 20, a calculation unit 25 for finding measured data representing the shape of the measuring subject based upon the detection results in the light-receiving unit 22, and an input-output unit 26 for inputting and outputting data to and from the data processing device 50. Here, the measured data, generated in the three-dimensional measuring device 20, are also allowed to include information relating to the measuring magnification that has been set at the time of carrying out the measuring operation, and the data processing device 50 is allowed to carry out a data processing operation in which the measuring magnification is taken into consideration.

The data processing device 50, which is composed of a so-called computer (PC), is provided with a control unit 51 constituted by a CPU, etc., a storing unit 53 constituted by memories, magnetic disk devices, etc., and a data input-output unit 56 for carrying out data input-output operations.

The control unit 51 controls measuring operations of the respective three-dimensional measuring devices 10, 20, and inputs measured data from the respective three-dimensional measuring devices 10, 20 through input-output unit 56. Moreover, the control unit 51 is also arranged to control the rotation angle of the rotation stage 30 by transmitting a control signal to the rotation stage 30.

The control unit 51 also functions as a data processing unit 52 by executing a predetermined data calibrating program, and is allowed to generate three-dimensional shape data which is represented by a world coordinate system in the three-dimensional shape-measuring system 1 in a data calibrating process; therefore, for this purpose, conversion parameters used for calibrating the measured data obtained from the respective three-dimensional measuring devices 10, 20 are preliminarily obtained.

Based upon designed values, the three-dimensional measuring devices 10, 20 are installed in the three-dimensional shape-measuring system 1; however, in general, these are not placed in optimal designed positions and orientations due to influences of installation errors, etc. For this reason, even when the measured data obtained from the respective three-dimensional measuring devices 10, 20 are converted into the world coordinate system based upon set values, it is not possible to obtain accurate three-dimensional shape data. Therefore, prior to actually measuring the measuring subject, a data calibration-use subject is used so that the respective three-dimensional measuring devices 10, 20 preliminarily measure the data calibration-use subject, and based upon the resulting measured data, the data processing device 40 is allowed to preliminarily find conversion parameters that are used to correct the measured data. This data calibrating process will be discussed later in detail.

Moreover, in the actual measuring process for measuring the measuring subject, based upon the conversion parameters thus preliminarily found, the data processing unit 52 converts the measured data from the respective three-dimensional measuring devices 10, 20 to generate three-dimensional shape data in which the surface shape of the measured subject is represented by the world coordinate system.

The storing unit 53 stores the respective parameters in the intermediate stages at the time of the data calibrating process, and also stores conversion parameters that are finally generated. Moreover, it also stores programs that are executed by the control unit 51.

The input-output unit 56 outputs control signals for the measuring operation to the respective three-dimensional measuring devices 10, 20, and also inputs measured data from the respective three-dimensional measuring devices 10, 20. Moreover, the input-output unit 56 is also designed to input data from a recording medium 9 that can be read by the computer; thus, in the case when a program such as the above-mentioned data calibrating program is stored in the recording medium 9, the control unit 51 of the data processing device 50 reads the program from recording medium 9 to execute the program.

The rotation stage 30 is provided with an input-output unit 36, a rotation control unit 31 and a rotation driving unit 32 so that the input-output unit 36 is arranged to carry out data communications with the data processing device 50. The rotation control unit 31 drives the rotation driving unit 32 such as a motor based upon a rotation angle instructed by a control signal from the data processing unit 50 to rotate the rotation stage 30. With this arrangement, the measuring subject, placed on rotation stage 30, is rotated so that the respective three-dimensional measuring device 10, 20 can also measure the shape of the measuring subject on its rear face side. Although illustrated as separate units in the drawing, the control unit 14 and the calculation unit 15 each may be constituted by a group of a plurality of circuits or may partly be constituted by a common circuit. Alternatively, these units may be the same circuit or may be a function achieved by software provided for one or more processors. The same applies to the control unit 24 and the calculation unit 25.

2. Data Calibration in Three-dimensional Shape-measuring System

The following description will discuss a data calibrating process in the three-dimensional shape-measuring system 1.

The calibrating process is performed prior to the initial three-dimensional measurement, and can thereafter be performed for correcting changes with years. Further, it is effective to perform the process in a measurement requiring a higher accuracy.

The contents of the data calibrating process includes a first data calibrating process that carries out a data calibration on relative positions and orientations on the respective three-dimensional measuring devices 10, 20 attached to the three-dimensional measuring system 1, a second data calibrating process in which the rotation stage 30 is rotated to find the position of the rotation axis to be measured and a data calibration is carried out so that the three-dimensional shape indicated by the measured data is accurately rotated and shifted centered on its rotation axis and a third data calibrating process that carries out a data calibration so as to carry out a high-precision composing process upon composing the measured data obtained from the respective three-dimensional measuring devices 10, 20 to generate single three-dimensional shape data.

In the respective calibrating processes, the respective three-dimensional measuring devices 10, 20 measure a calibration-use subject suitable for the purpose of each calibration so that the conversion parameters are found from the resulting measured data. Here, in the following description, the local coordinate system with respect to the first three-dimensional measuring device 10 is defined as the world coordinate system so that in the respective calibrating processes, conversion parameters, which convert the measured data obtained from the respective three-dimensional measuring devices 10, 20 to suitable data in the world coordinate system, are found.

Figure 8:
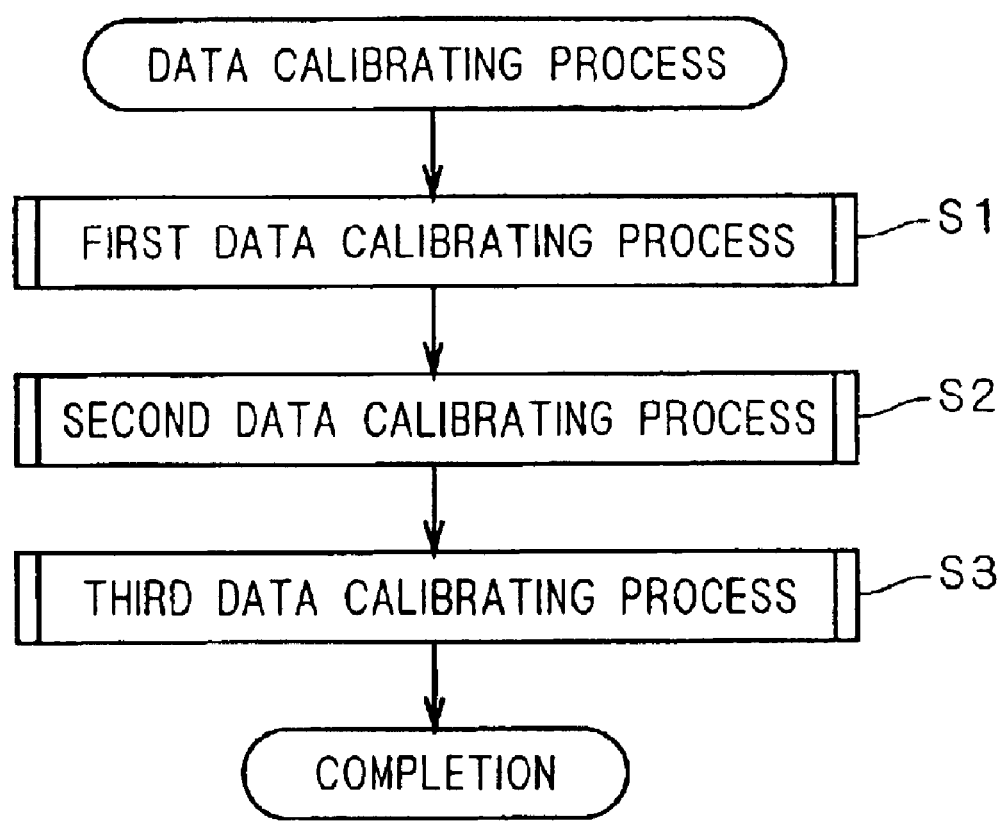
FIG. 8 is a flow chart showing a data calibrating process.

FIG. 8 is a flow chart that shows a data calibrating process. As shown in FIG. 8, in the data calibrating process, a first data calibrating process (step S1), a second data calibrating process (step S2) and a third data calibrating process (step S3) are carried out in this order.

Figure 9:
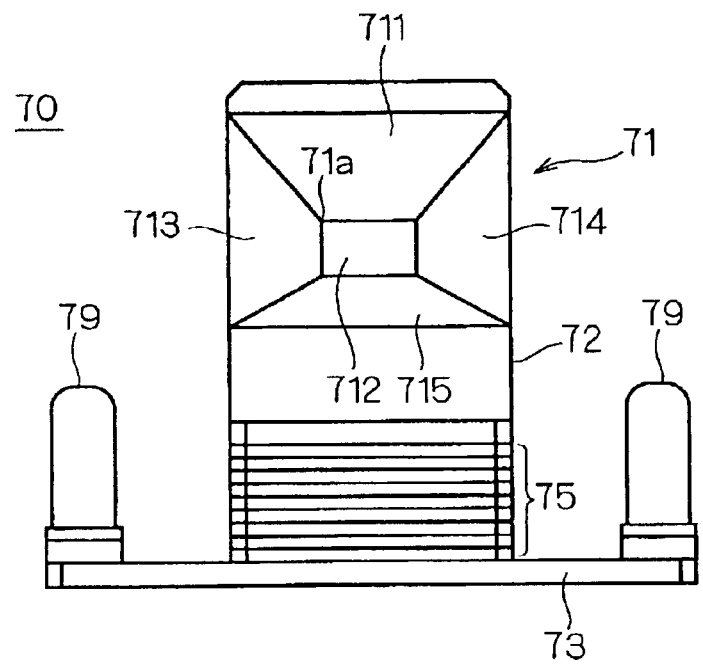
FIG. 9 is a view showing a data calibration-use subject used in a first data calibrating process.
Figure 10:
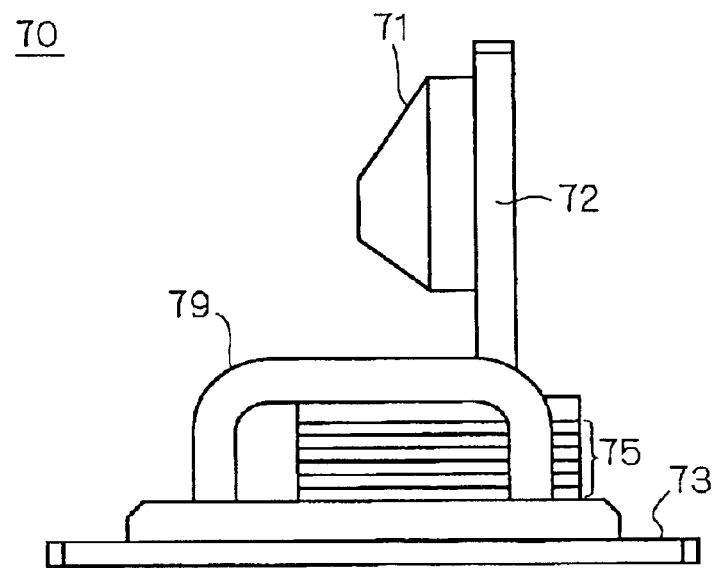
FIG. 10 is a view showing the data calibration-use subject used in the first data calibrating process.

First, the following description will explain the first data calibrating process. FIGS. 9 and 10 are views that show a data calibration-use subject 70 that is used in the first data calibrating process. FIG. 9 is a front view of the data calibration-use subject 70, and FIG. 10 is a side view of the data calibration-use subject 70. Moreover, FIG. 11 shows a state in which the data calibration-use subject 70 is placed in the three-dimensional shape-measuring system 1.

As shown in FIGS. 9 and 10, a measurement-subject portion 71 having a polyhedron structure is formed on the front side of the data calibration-use subject 70, and the measurement-subject portion 71 is supported by a supporting member 72. A plurality of spacer plates 75 are placed between the supporting member 72 and a base 73, and the height position of measurement-subject portion 71 can be adjusted by changing the number of spacer plates 75. Here, handle portions 79 are attached to the base 73 on both of the end sides of the base 73 so that the data calibration-use subject 70 can be easily carried. Therefore, the data calibration-use subject 70 is arranged so that the position of the measurement-subject portion 71 in the measurement space 3 can be changed.

The polyhedron shape of measurement-subject portion 71 is constituted by five faces 711 to 715, each formed as a plane, and the three planes placed adjacent to each other of the five planes are arranged so as to intersect each other at one point. It is preferable to design measurement-subject portion 71 so as not to form shadowed face from the respective three-dimensional measuring devices 10, 20 when data calibration-use subject 70 is placed on rotation stage 30.

Figure 11:
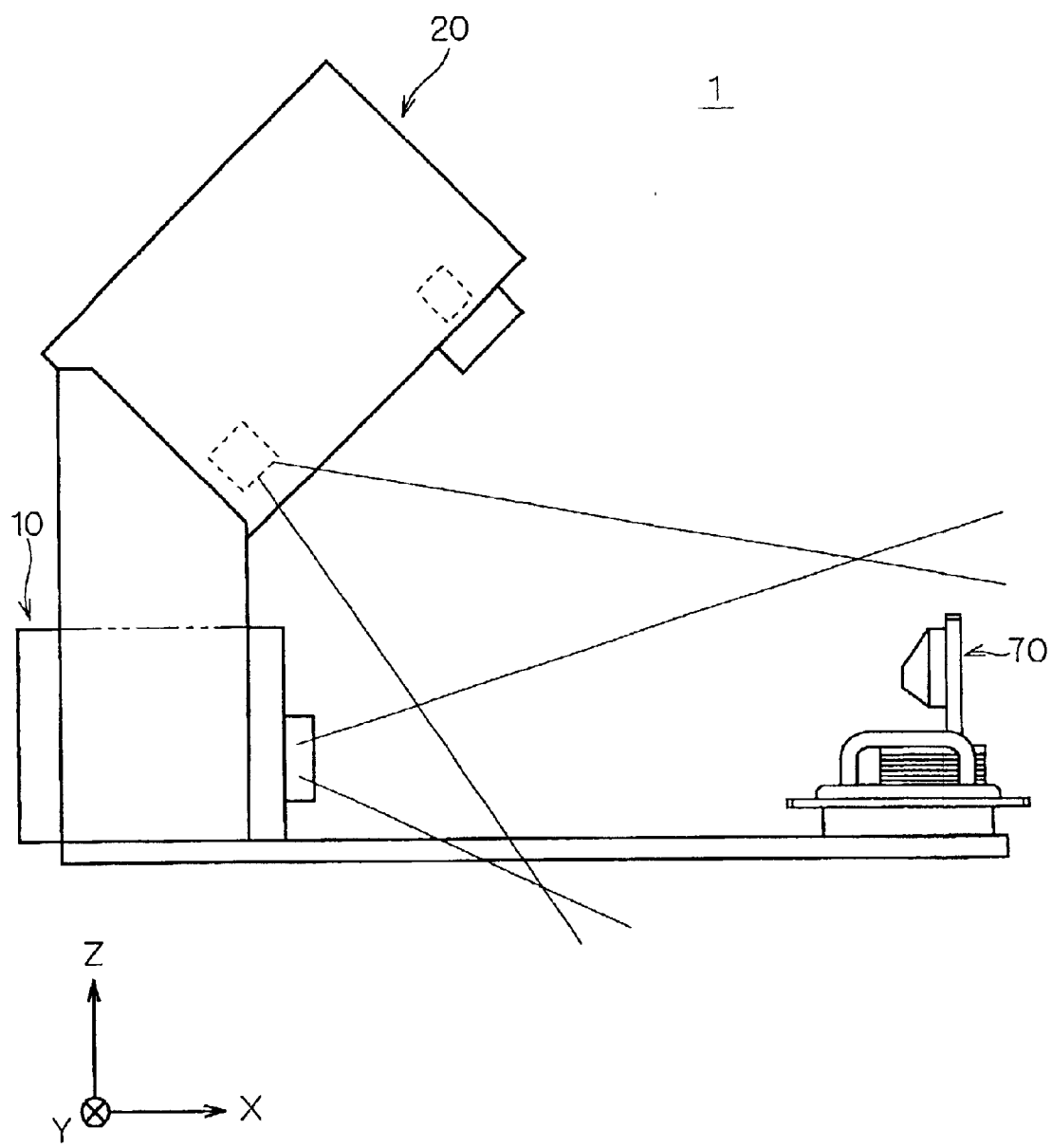
FIG. 11 is a view showing a state in which the data calibration-use subject is placed in the three-dimensional shape-measuring system.

Upon carrying out the first data calibrating process, the above-mentioned data calibration-use subject 70 is set in such a state shown in FIG. 11, that is, in such a state that the respective faces of the measurement-subject portion 71 are measured by the respective three dimensional measuring devices 10, 20.

Then, in the first data calibrating process, the measurement-subject portion 71 is measured by the respective three-dimensional measuring devices 10, 20, and a process is carried out such that the coordinate values of the same apexes (for example, an apex 71a formed as an intersection among three faces 711, 712 and 713) in the resulting measured data are made coincident with each other. More specifically, conversion parameters which coordinate-convert the measured data obtained from the second three-dimensional measuring device 20 into coordinate data of the world coordinate system are obtained. However, in order to find conversion parameters in which relative positions and orientations of the three-dimensional measuring devices 10, 20 are taken into consideration, at least three apexes that are not on the same straight line need to be measured by the respective three-dimensional measuring devices 10, 20. For this reason, data calibration-use subject 70 is designed so that its height position of measurement-subject portion 71 can be altered, and as shown in FIG. 11, it is also designed so that the user can shift the data calibration-use subject 70 in the X direction so as to alter the distance from the respective three-dimensional measuring devices 10, 20. Here, a shifting mechanism in the X-direction may be attached to data calibration-use subject 70 so that the position of data calibration-use subject 70 in the X-direction may be changed by a control signal from data processing device 50.

FIG. 12 is a flow chart that shows a first data calibrating process.

First, the user places data calibration-use subject 70 having the polyhedron is placed on rotation stage 30 (step S100). At this time, it is placed in such a manner that measurement-subject portion 71 of data calibration-use subject 70 faces the respective three-dimensional measuring devices 10, 20 with laser slit light from the respective three-dimensional measuring devices 10, 20 are made incident on at least the three faces that are adjacent to each other.

Then, data processing device 50 of three-dimensional shape-measuring system 1 gives an instruction on the measuring operation so that the measuring operation of data calibration-use subject 70 is carried out by the first three-dimensional measuring device 10, that is, a scanning operation is carried out by the first three-dimensional measuring device 10 (step S102). Thus, data calibration-use subject 70 is scanned in the Y-direction by laser slit light L1 having a distribution in the Z-direction so that measured data is generated in the first three-dimensional measuring device 10. The measured data, generated in the first three-dimensional measuring device 10, is outputted to data processing device 50.

Next, the sequence proceeds to step S104 in which data processing device 50 calculates coordinates of a single apex of data calibration-use subject 70 in the local coordinate system in the first three-dimensional measuring device 10. In this step S104, processes shown in a flow chart of FIG. 13 are carried out.

In data-processing device 50, data-processing unit 52 generates three-dimensional shape data with respect to the local coordinate system that is inherently defined with respect to the first three-dimensional measuring device 10, based upon measured data obtained from the first three-dimensional measuring device 10 (step S130). At this time, based upon the measuring magnification set at the time of the measuring operation of three-dimensional measuring device 10, the three-dimensional shape data is enlarged or reduced, and even in the case when the measurements are carried out in a state where the measuring magnification has been altered, appropriate three dimensional shape data is generated. Here, since the local coordinate system that is inherent to the first three-dimensional measuring device 10 forms the world coordinate system, three-dimensional coordinate values represented by the world coordinate system, that is, three-dimensional shape data, is generated from the measured data obtained from the first three dimensional measuring device 10 in step S130.

Next, data processing unit 52 selects three faces 711, 712, 713 that form a specific single apex (for example, an apex 71a) from the surface coordinates of data calibration-use subject 70, and extracts a set of points included in each of the three faces 711, 712, 713 (step S132). With respect to specific methods, in one method, measured data is formed into a two-dimensional image, and intersecting lines of each face are extracted through edge detection so that the respective faces are divided into regions by the extracted intersecting lines, and in another method, normal vectors of a face formed by the closest three points in the three-dimensional coordinate values are found so that a group of points in which the normal vectors are aligned in the same direction are extracted; thus, various known methods may be used.

Then, the least squares method is applied to coordinate information of the group of points extracted with respect to each face, and equations representing the respective three faces are calculated (step S134). These simultaneous equations directed with respect to the respective faces are solved to find the coordinates of the apex formed by three faces 711, 712, 713 (step S136). The apex coordinates thus found are given from data processing unit 52 to storing unit 53, and stored in storing unit 53 (step S138).

Upon completion of these processes, the processes in the first three-dimensional measuring device 10 is completed, and the sequence returns to the flow chart in FIG. 12.

Next, data processing device 50 in three-dimensional shape-measuring system 1 gives an instruction for a measuring operation to the second three-dimensional measuring device 20 so that the second three-dimensional measuring device 20 carries out the measuring operation on data calibration-use subject 70, that is, a scanning operation is carried out by the second thee-dimensional measuring device 20 (step S106). In this scanning operation, data calibration-use subject 70 is scanned in the Z-direction by laser slit light L2 having a distribution in the Y-direction so that measured data is generated in the second three-dimensional measuring device 20. The measured data, generated by the second three-dimensional measuring device 20, is outputted to data processing device 50.

Next, the sequence proceeds to step S108 in which data processing device 50 calculates coordinates of a single apex of data calibration-use subject 70 in the local coordinate system of the second three-dimensional measuring device 20. In this step S108, processes in a flow chart shown in FIG. 14 are carried out.

In data processing device 50, data processing unit 52 generates three dimensional shape data represented by the local coordinate system that is inherently defined with respect to the second three-dimensional measuring device 20 from the measured data obtained from the second three dimensional measuring device 20 (step S140). At this time also, the three-dimensional shape data is subjected to an enlarging or reducing process based upon the measuring magnification that has been set when three-dimensional measuring device 20 carries out the measuring operation; therefore, even when the measurement is carried out with the measuring magnitude having been changed, appropriate three-dimensional data is generated.

Next, data processing unit 52 selects three faces 711, 712, 713 forming a specific single apex (for example, an apex 71a) from the surface coordinates of data calibration-use subject 70, and extracts a set of points included in each of the three faces 711, 712, 713 (step S142). Here, the specific method is the same as the method carried out with respect to the first three-dimensional measuring device 10. Moreover, the three faces selected here are the same as those selected in step S132 in the flow chart of FIG. 13.

Then, the least squares method is applied to coordinate information of the group of points extracted with respect to each face, and equations representing the respective three faces are calculated (step S144). These simultaneous equations directed with respect to the respective faces are solved to find the coordinates of the apex 71a formed by the three faces 711, 712, 713 (step S146). The apex coordinates thus found here are coordinates represented by the local coordinate system of the second three-dimensional measuring device 20. Then, the coordinates of the apex thus found are given to storing unit 53 from data processing unit 52, and stored in storing unit 53 (step S148).

Upon completion of these processes, the processes in the second three-dimensional measuring device 20 is completed, and the sequence again returns to the flow chart of FIG. 12.

Data processing device 50 makes a determination as to whether or not apex coordinates of not less than three points have been calculated (step S110), and in the case when those of not less than three points have been calculated, allows the sequence to proceed to step S114.

In contrast, when those of not less than three points have not been calculated, it gives an instruction to the user to shift the position of data calibration-use subject 70. Thus, the user shifts the data calibration-use subject 70 so that the positions of the apexes that have been subjected to the coordinate calculations at step S104, S108 are changed (step S112). Moreover, the user may change the position of the height of measurement subject unit 71 by changing the number of sheets of spacer plates 75. Furthermore, in the case when data calibration-use subject 70 is provided with a shifting mechanism, an arrangement may be made so that the position of data calibration-use subject 70 is automatically shifted by the control of data processing device 50. Here, data processing device 50 may control rotation stage 30 so that rotation state 30 is rotated to shift data calibration-use subject 70.

Then, the sequence returns to step S102 to carry out processes of steps S102 to S108 repeatedly in a state where the position of apex 71a has been shifted, and based upon the measured data from the respective three-dimensional measuring devices 10, 20, apex coordinates of the same apex are calculated. When the coordinate values of three different apexes have been found based upon the measurements in the respective three-dimensional measuring devices 10, 20, the sequence proceeds to step S114.

Here, the number of the apexes is not limited to three, and any number may be selected as long as it is not less than three. As the number of the apexes increases, the precision in the data calibration improves so that from the viewpoint of high precision, it is more preferable to find apex coordinates of more apexes. In contrast, as the number of the apexes increases, the processing efficiency in the first data calibrating process is reduced; therefore, from the viewpoint of the processing efficiency, it is preferable to find coordinates of three apexes.

At step S114, data processing unit 52 generates a data combination between the apex coordinates obtained from the first three-dimensional measuring device 10 and the apex coordinates obtained from the second three-dimensional measuring device 20. In this data combination, since the coordinates corresponding to the same apex are combined into the pair, not less than three data pairs are generated in step S114.

Then, data processing unit 52 finds an equation used for converting the apex coordinates represented by the local coordinate system of the second three-dimensional measuring device 20 into those of the world coordinate system (step S116) for each data pair. In this equation, a conversion parameter (first conversion parameter), used for converting the apex coordinates represented by the local coordinate system of the second three-dimensional measuring device 20 into those of the world coordinate system, is used as an unknown quantity. This first conversion parameter includes a rotation matrix for rotation-shifting the apex coordinates in the three-dimensional space and a translation shifting matrix for shifting them translationally therein.

At step S118, data processing unit 52 finds the value of the first conversion parameter by solving simultaneous equations generated from each of the data pairs. Data processing unit 52 stores the first conversion parameter thus generated in storing unit 53 of data processing unit 50 (step S120).

By converting the measured data obtained from the second three-dimensional measuring device 20 using this first parameter, the apex coordinates represented by the local coordinate system can be converted to the world coordinate system so that shape data in the world coordinate system, which is corrected in the relative positional relationship and orientation relationship between the respective three-dimensional measuring devices 10, 20, is obtained.

Thus, the first data calibrating process is completed. Through this first data calibrating process, it is possible to find the conversion parameters for coordinate-converting the measured data obtained from the second three-dimensional measuring device 20 to coordinate data of the world coordinate system. In the above-mentioned process, the local coordinate system of the second three-dimensional measuring device 20 is converted to the local coordinate system (world coordinate system) of the first three-dimensional measuring device 10; therefore, in comparison with the case in which another world coordinate system is set separately from the local coordinate system of the first three-dimensional measuring device 10, since only the first conversion parameter needs to be found with respect to the measured data obtained from the second three-dimensional measuring device 20 based upon the measured data obtained from the second three-dimensional measuring device 20, it becomes possible to carry out an efficient process.

Moreover, in the first data calibrating process, the processing mode is provided such that the respective three-dimensional measuring devices 10, 20 measure planes to find apex coordinates. In the case when the respective three-dimensional measuring devices 10, 20 measure planes, since high-precision measurements are available even when the measuring magnifications of the three-dimensional measuring devices 10, 20 are changed, it becomes possible to find the coordinates of the respective apexes with high precision. Therefore, the first conversion parameter forms a high-precision parameter used for coordinate-converting the measured data obtained from the second three-dimensional measuring device 20 to those in the world coordinate system. Consequently, the three-dimensional shape data obtained by measuring the measuring subject in three-dimensional shape-measuring system 1 is also provided as correct data.

Moreover, another advantage is that, by using data calibration-use subject 70 having a polyhedron structure as described above, it is possible to form data calibration-use subject 70 in a comparatively easy manner. For example, in the case when, by using a globe body, a data calibrating process for finding the center coordinates of the globe body is carried out, it is difficult to shape the globe face of the globe body to be used with high precision, and the corresponding process makes the globe body expensive. In contrast, when the above-mentioned data calibration-use subject 70 having a polyhedron structure is used, it is comparatively easy to shape planes with high precision so that it is possible to form the subject at low costs, and also to achieve data calibration-use subject 70 with high reliability.

Moreover, this arrangement is less susceptible to effects of the measuring magnification of the respective three-dimensional measuring devices 10, 20 so that the planes are measured with high precision even when measured at any measuring magnification; thus, it becomes possible to carry out the data calibration with high precision.

Here, the above explanation has exemplified a case in which data calibration-use subject 70 is shifted at step S112; however, in the case when measurement subject unit 71 has a structure as shown in FIG. 9, only one scanning operation of each of three-dimensional measuring devices 10, 20 makes it possible to find apex coordinates of four points so that it is possible to direct coordinates of required number of apexes without the necessity of shifting data calibration-use subject 70; thus, such a processing sequence may be used.

Moreover, with respect to the data calibration-use subject used in the first data calibrating process, any shape may be used to find apex coordinates preferably as long as at least arbitrary three planes of the polyhedron structure intersect at one point (not limited to an apex of the polyhedron structure, but provided as a virtual point); therefore, it is not intended to be limited by the polyhedron having the structure as described above.

Figure 15:
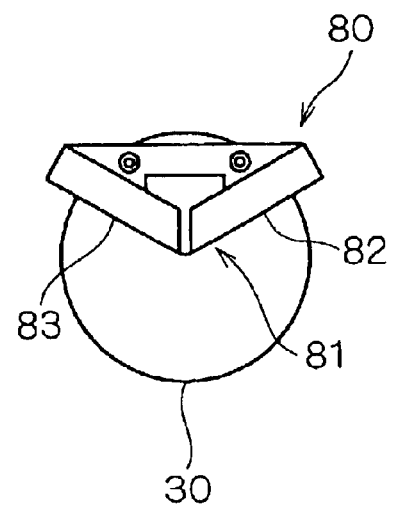
FIG. 15 is a view showing a rotation-axis calibration-use subject used in a second data calibrating process.
Figure 16:
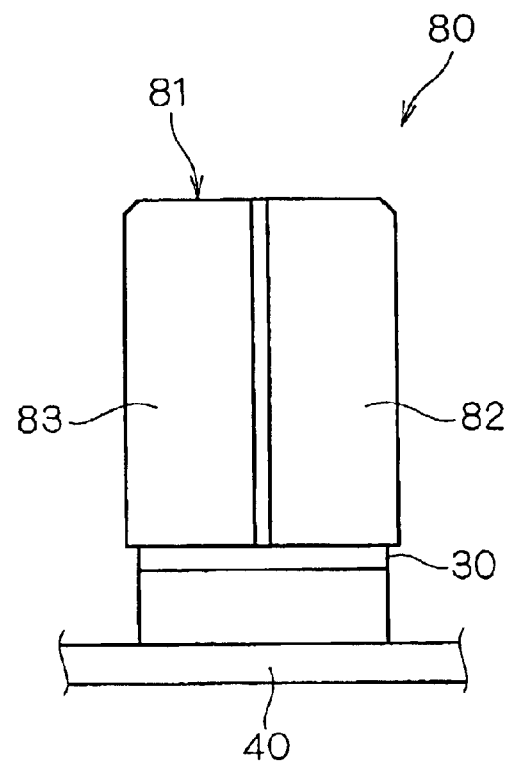
FIG. 16 is a view showing the rotation-axis calibration-use subject used in the second data calibrating process.

Next, the following description will discuss the second data calibrating process. FIGS. 15 and 16 are views that show a rotation-axis calibration-use subject 80 that is used in the second data calibrating process; FIG. 15 is a view in which the calibration-use subject 80 is viewed from above; and FIG. 16 is a front view of the calibration-use subject 80. Moreover, both of FIGS. 15, 16 show a state in which the calibration-use subject 80 is placed on a rotation stage 30.

As shown in FIGS. 15 and 16, a measurement subject unit 81 having two planes 82, 83 that are parallel to the vertical direction (Z-direction), respectively, is placed on the front face side of the calibration-use subject 80, with the lower face side of measurement subject unit 81 being in contact with the upper face side of rotation stage 30.

The normal directions of the respective planes 82, 83 in measurement subject unit 81 are not parallel with each other, and the respective planes 82 and 83 are set so as to have predetermined angles. Therefore, in measurement subject unit 81, when two planes 82 and 83 are extended, these are allowed to intersect on straight lines (crossing lines) in parallel with each other in the vertical direction.

When this calibration-use subject 80 is placed on rotation state 30, it is set so that the crossing lines of two planes 82, 83 are coincident with the rotation axis of rotation stage 30. Moreover, two planes 82, 83 are placed with orientations so as to be measured from the respective three-dimensional measuring devices 10, 20.

Here, in the second data calibrating process, measurement subject unit 81 is measured by the respective three-dimensional measuring devices 10, 20 so that equations of the crossing lines are found from the resulting measured data. Since the crossing lines correspond to the rotation axis of rotation stage 30, the equation of the crossing lines represents an equation indicating the rotation axis of the rotation stage 30. Then, a rotation conversion parameter, which is used for rotation-shifting coordinate data centered on the rotation axis thus found, is calculated.

The rotation conversion parameter is found in the second data calibrating process so that, when three-dimensional shape data is generated through the measurements of the measurement subject, it is possible to rotate the three-dimensional shape data around the rotation axis.

Figure 17:
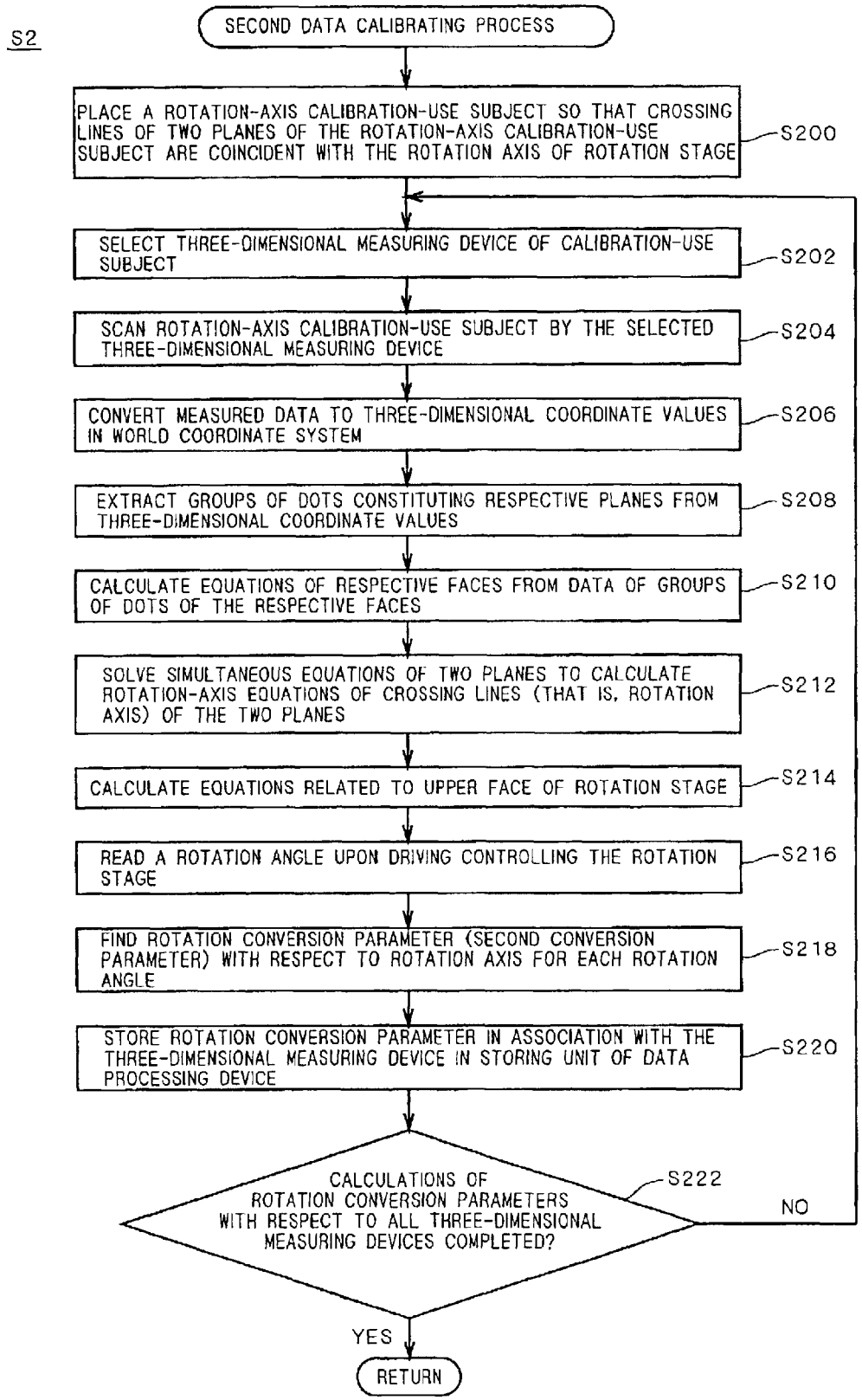
FIG. 17 is a flow chart showing the second data calibrating process in detail.

FIG. 17 shows a flow chart that shows the second data calibrating process (step S2) in detail.

First, the user places the calibration-use subject 80 provided with two planes 82, 83 on rotation stage 30 (step S200). At this time, it is placed so that measurement subject unit 81 of the calibration-use subject 80 faces the respective three-dimensional measuring devices 10, 20, and so that the crossing lines of two planes 82, 83 are coincident with the rotation axis of rotation stage 30.

The data processing device 50 selects the three-dimensional measuring device to be subject to calibration from three-dimensional measuring devices 10, 20 (step S202). For example, at first, the first three-dimensional measuring device 10 is selected as the subject to calibration.

The data processing device 50 allows selected three-dimensional measuring device 10 to scan the calibration-use subject 80 so that the reading operation of the surface shape of the calibration-use subject 80 is carried out (step S204).

The data processing unit 52 of data processing device 50 converts the measured data obtained from three-dimensional measuring device 10 to three-dimensional coordinate values in the world coordinate system (step S206). In this case also, based upon the measuring magnification set at the time when the three-dimensional measuring device executes the measuring operation, the three-dimensional shape data is enlarged or reduced so that appropriate three-dimensional shape data is generated even when the measurements are carried out with the measuring magnification having been changed. Here, since the local coordinate system of the first three-dimensional measuring device 10 is a world coordinate system, the measured data obtained from the first three-dimensional measuring device 10 forms coordinate values in the world coordinate system only when it is represented by the local coordinate system of the first three-dimensional measuring device 10. In contrast, when the second three-dimensional measuring device 20 is to be calibrated, the measured data obtained from the second three-dimensional measuring device 20 is converted by using the first conversion parameter obtained from the first data calibrating process so that it is possible to easily convert it to the coordinate values in the world coordinate system.

After the measured data obtained from the three-dimensional measuring device subjected to calibration has been converted to coordinate values in the world coordinate system, data of a group of points, constituting two planes 82, 83 of the calibration-use subject 80, is next extracted (step S208). In other words, data of a group of points contained in plane 82 and data of a group of points contained in plane 83 are respectively extracted.

The data processing unit 52 calculates equations of the respective faces 82, 83 from the data of groups of points of the respective faces 82, 83 (step S210). Data processing unit 52 solves simultaneous equations obtained from two faces 82, 83 so as to calculate a rotation-axis equation indicating the crossing-lines of the two planes (that is, the rotation axis of rotation stage 30)(step S212). This rotation-axis equation makes it possible to specify the position of the rotation axis of rotation stage 30 in the three-dimensional space in the world coordinate system.

Next, data processing unit 52 calculates an equation representing a face related to the upper face of rotation stage 30 (step S214). For example, in the case when known data (known shape data) relating to data calibration-use subject 70 that has been used upon carrying out the first data calibrating process (step S1) exists, based upon the apex coordinates measured in the first data calibrating process (step S1) and the position of the designed height of the apex in data calibration-use subject 70, the position of the upper face of rotation state 30 is specified so that it becomes possible to find the equation representing the upper face of rotation stage 30. Here, the equation related to the upper face of rotation stage 30 may be found through another method.

Next, data processing unit 52 reads a rotation angle (control angle) preliminarily set to rotation-control rotation stage 30 from storing unit 53 (step S216). Thus, when three-dimensional shape-measuring system 1 measures a measuring subject from all directions, it becomes possible to identify what degrees rotation stage 30 should be rotated at for each rotation process so as to measure the measuring subject.

Then, data processing unit 52 finds a rotation conversion parameter with respect to the rotation axis for each rotation angle (step S218). In other words, for each angle at which the sign of the rotation angle of rotation stage 30 is inverted, a rotation conversion parameter is found so as to carry out rotation conversion centered on the rotation axis specified by the above-mentioned rotation-axis equation. The measured data is converted by using this rotation conversion parameter so that the three-dimensional shape directed by the measured data can be rotated by an angle corresponding to the rotation angle of rotation stage 30 obtained when the measuring subject is measured by the three-dimensional measuring device selected as the calibration subject.

In order to find which three-dimensional measuring device the rotation conversion parameter to be found in step S218 corresponds to, the three-dimensional measuring device to be calibrated and the rotation conversion parameter for each rotation angle are made in association with each other, and the resulting data is stored in storing unit 53 of data processing device 50 (step S220).

Further, data processing device 50 makes a determination as to whether or not the calculations of rotation conversion parameters with respect to all the three-dimensional measuring devices 10, 20 have been completed (step S222), and if these are completed with respect to all of them, the second data calibrating process is completed.

In contrast, if not completed, the sequence returns to step S202 so as to find the rotation conversion parameters with respect to the other three-dimensional measuring device. When the rotation conversion parameters have been found with respect to the first three-dimensional measuring device 10, the processes of steps S202 to S220 are repeated in order to next find rotation conversion parameters with respect to the second three-dimensional measuring device 20.

In the case when the rotation conversion parameters are found with respect to the second three-dimensional measuring device 20, by using the first conversion parameters obtained by the first data calibrating process at step S206, the measured data is converted to those in the world coordinate system, and based upon the coordinate values represented by the world coordinate system, the rotation conversion parameters are found. The first conversion parameters and the rotation conversion parameters found at step S218 are composed so that parameters (second conversion parameters) which simultaneously carry out the conversion to the world coordinate system and the rotation conversion are found. Thereafter, the first conversion parameters are no longer required.

In the second data calibrating process of this type, a processing mode is set in such a manner that the respective three-dimensional measuring devices 10, 20 measure two planes of the calibration-use subject to find the rotation axis of rotation stage 30. Therefore, since the rotation axis is found with high precision by measuring the planes with high precision, it becomes possible to find both of the rotation conversion parameter and the second conversion parameter with high precision. Consequently, the three-dimensional shape data, obtained by measuring all the circumference of the measuring subject by using three-dimensional shape measuring system 1, is also provided as accurate data.

Moreover, the plane is measured with high precision even when measured at any measuring magnification, without having adverse effects from the measuring magnification of the respective three-dimensional measuring devices 10, 20 so that it becomes possible to carry out a high-precision data calibrating process.

Here, in the case when three-dimensional shape measuring system 1 is not provided with rotation stage 30 so that only the front-side three-dimensional shape of the measuring subject is measured, the second data calibrating process is not necessarily required. Moreover, the calibration-use subject used in the second data calibrating process is not intended to be limited by those described above.

Figure 18:
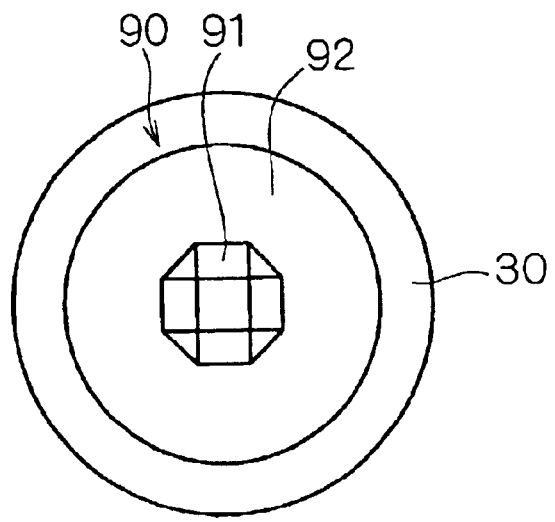
FIG. 18 is a view showing a high-precision calibration-use subject used in a third data calibrating process.
Figure 19:
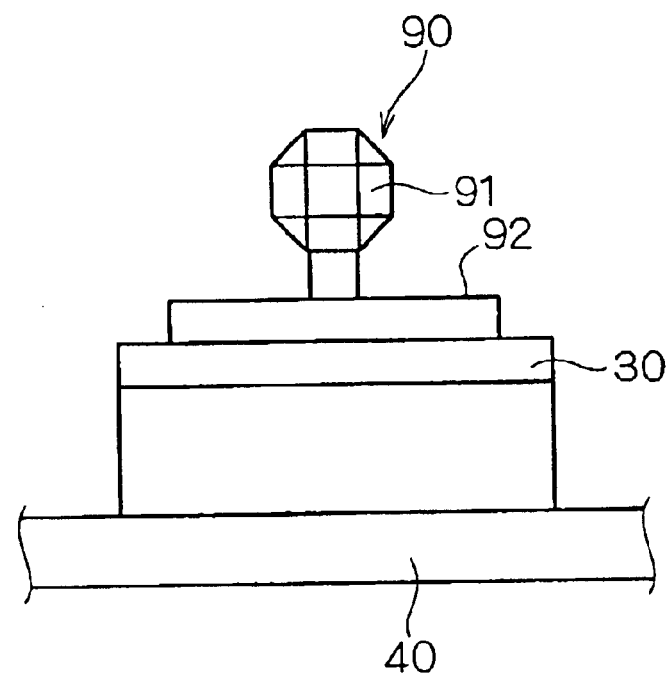
FIG. 19 is a view showing the high-precision calibration-use subject used in the third data calibrating process.

Next, the following description will discuss the third data calibrating process. FIGS. 18 and 19 are views that show a high-precision calibration-use subject 90 to be used in the third data calibrating process; and FIG. 18 is a view that shows the calibration-use subject 90 viewed from above, and FIG. 19 is a front view showing the calibration-use subject 90. Here, both of FIGS. 18 and 19 show a state in which the calibration-use subject 90 is placed on rotation stage 30.

As shown in FIGS. 18 and 19, the calibration-use subject 90 is constituted by a measurement subject unit 91 having a polyhedron structure and a supporting member 92 that supports measurement subject unit 91; thus, the polyhedron structure of measurement subject unit 91 has a plurality of planes that are formed with high precision based upon known data such as CAD data. Moreover, supporting member 92 is placed on rotation stage 30.

When a measuring subject is actually measured by three-dimensional shape-measuring system 1 to convert the three-dimensional shape of the measuring subject to data, measured data are composed for each rotation angle obtained from the respective three-dimensional measuring devices 10, 20 to form data of a single three-dimensional shape. In the third data calibrating process, high-precision conversion parameters (third conversion parameters) of the measured data obtained from the respective three-dimensional measuring devices 10, 20 are found in order to carry out the composing process with high precision.

The calibration-use subject 90 is measured through the third data calibrating process to find high-precision conversion parameters which allow measured data to approach known data; thus, it becomes possible to compose measured data obtained by measuring the measuring subject by the respective three-dimensional measuring devices 10, 20 with high precision.

Figure 20:
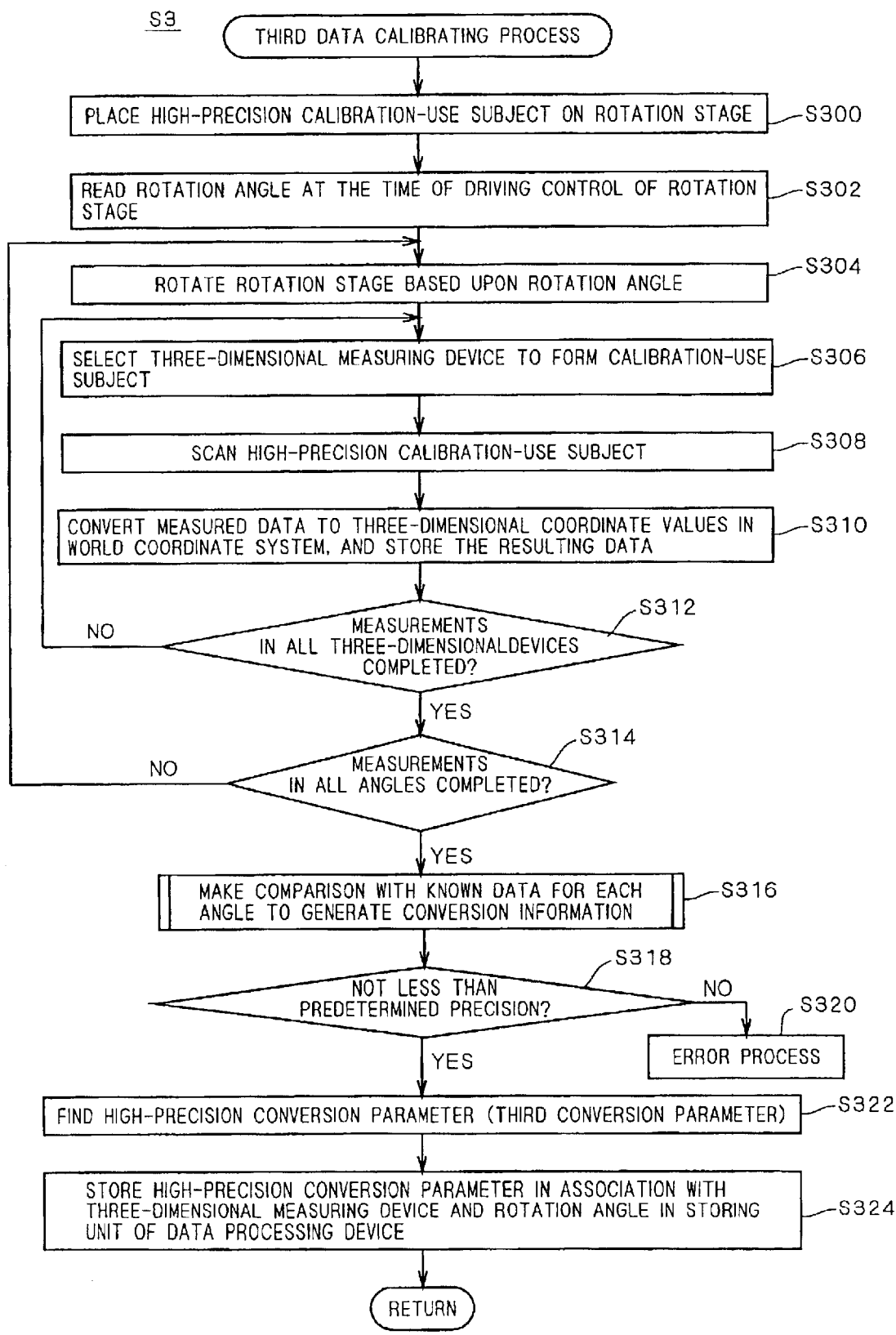
FIG. 20 is a flow chart showing the third data calibrating process in detail.

FIG. 20 is a flow chart that shows the third data calibrating process (step S3) in detail.

First, the user places the calibration-use subject 90 shown in FIGS. 18 and 19 on rotation stage 30 (step S300). At this time, it is preferable to place it so that the rotation axis of rotation stage 30 is allowed to pass through the center position of measurement subject unit 91 of the calibration-use subject 90.

Data processing unit 52 reads a rotation angle (control angle) that has been preliminarily set so as to control the rotation of rotation stage 30 from storing unit 53 (step S302). With this arrangement, when three-dimensional shape-measuring system 1 measures a measuring subject from all directions, it becomes possible to identify what degrees rotation stage 30 should be rotated at for each rotation process so as to measure the measuring subject. Then, control unit 51 gives a control signal to rotation stage 30 so as to rotate rotation stage 30 by a rotation angle corresponding to the read rotation angle (step S304).

Next, data processing device 50 selects a three-dimensional measuring device to be calibrated from three-dimensional measuring devices 10, 20 (step S306). For example, at first, the first three-dimensional measuring device 10 is selected as the calibration subject.

The data processing device 50 allows the selected three-dimensional measuring device to scan the calibration-use subject 90 so as to carry out a reading operation on the surface shape of the calibration-use subject 90 (step S308).

The data processing device 52 converts measured data obtained from the three-dimensional measuring device into three-dimensional coordinate values in the world coordinate system, and stores the resulting data (step S310). More specifically, based upon the three-dimensional measuring device to be calibrated and the current rotation angle of rotation stage 30, data processing unit 52 reads parameters that have been obtained from the second data calibrating process (step S2) and that carry out the conversion to the world coordinate system and the rotation conversion from storing unit 53, and converts the measured data to coordinate values in the world coordinate system by using the conversion parameters thus read. At this time also, the three-dimensional shape data is subjected to an enlarging or reducing process based upon the measuring magnification that has been set when the three-dimensional measuring device carries out the measuring operation; therefore, even when the measurement is carried out with the measuring magnitude having been changed, appropriate three-dimensional data is generated.

Then, data processing device 50 makes a determination as to whether or not all the three-dimensional measuring devices 10, 20 have measured the calibration-use subject 90 (step S312), and when the measurements have been completed in all the three-dimensional measuring devices 10, 20, the sequence proceeds to step S314. In contrast, when only the measurements in the first three-dimensional measuring device 10 have been completed, the sequence returns to step S306 so as to successively carry out measurements in the second three-dimensional measuring device 20. In this step, the second three-dimensional measuring device 20 is selected as a calibration subject, and a scanning operation of the calibration-use subject (step S308) and a converting process for converting the resulting measured data to three-dimensional coordinate values in the world coordinate system (step S310) are carried out.

Therefore, through loop processes of steps S306 to S312, the calibration-use subject 90 is measured by the respective three-dimensional measuring devices 10, 20 with the rotation angle of rotation stage 30 being set at a certain angle, and as a result, it becomes possible to generate three-dimensional coordinate values (three-dimensional shape data) measured by the respective three-dimensional measuring devices 10, 20.

At step S314, data processing device 50 makes a determination as to whether or not measurements have been carried out on the calibration-use subject 90 at all the angles, and when the measurements have not been carried out on the calibration-use subject 90 at all the angles, the sequence returns to step S304 so that, with rotation stage 30 being driven to rotate, the respective three-dimensional measuring devices 10, 20 carry out measurements on the calibration-use subject 90 in this state. Therefore, through the loop processes of steps S304 to S314, measuring operations are carried out in a state at which the calibration-use subject 90 is rotated at each predetermined rotation angle so that three-dimensional shape data, measured at each predetermined rotation angle by the respective three-dimensional measuring devices 10, 20, is generated.

Upon completion of the measurements at all the angles, since the measurements have been completed with respect to all the circumference of the calibration-use subject 90, the sequence proceeds to step S316 where the three-dimensional coordinate values of the calibration-use subject 90, obtained at each rotation angle, are compared with known data of the calibration-use subject 90 so that conversion information for allowing the three-dimensional coordinate values found through the measurements to approach the known data is generated.

Figure 21:
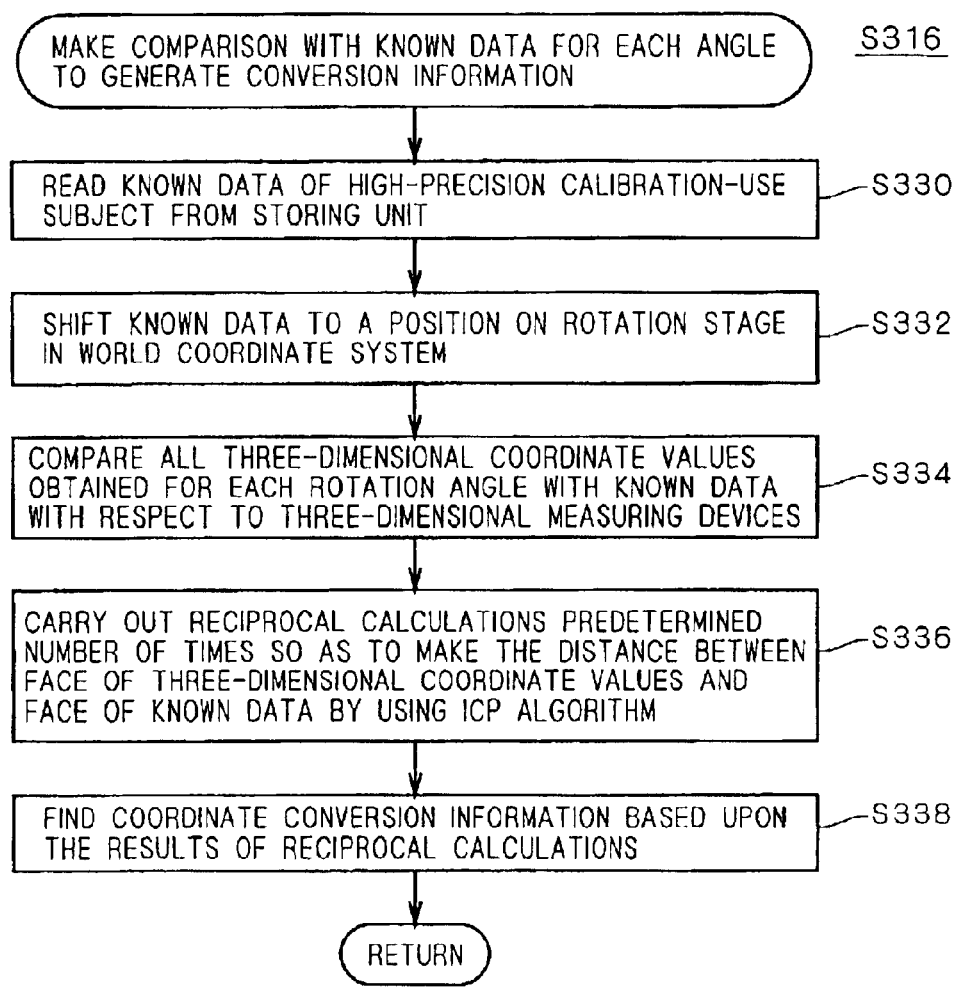
FIG. 21 is a flow chart showing a process in step S316 in detail.

FIG. 21 is a view that shows a process for making comparison with the known data for each angle to generate conversion information (step S316) in detail. The data processing unit 52 reads known data of the calibration-use subject 90 from storing unit 53 (step S330). Then, based upon the equation related to the upper face of rotation stage 30 found at step S214 and rotation axis equation found at step S212, data processing unit 52 places the known data thus read so as to be positioned on rotation stage 30 in the three-dimensional space in the world coordinate system to find three-dimensional coordinate values based upon the known data (step S332). Further, the three-dimensional coordinate values obtained at each rotation angle with respect to the three-dimensional measuring devices 10, 20 are compared with the three-dimensional coordinate values based upon the known data (step S334). In the comparing process in this step, coordinate values of one point in the three-dimensional coordinate values for each rotation angle obtained with respect to the three-dimensional measuring devices 10, 20 are compared with the coordinate values in the three-dimensional coordinate values based upon the corresponding known data.

Next, data processing unit 52 carries out calculations based upon the known ICP (Interactive Closest Points) algorithm repeatedly predetermined times so as to minimize the distance between the face of the three-dimensional coordinate values found by the measurements and the face based upon the known data (step S336). The ICP algorithm is an algorithm which finds coordinate conversion information that is used for minimizing the distance between the faces by repeating operations; however, in the present system, since the shape and the degree of deviations are preliminarily limited, the number of repetition of calculations is set to a fixed value. Moreover, the number of dots used as processing subject may be changed in accordance with the number of repetition of calculations. For example, when the calculations are carried out 60 times as a whole, the first calculations of 10 times as a minimum unit may use 4 points as processing subjects, the next calculations of 20 times may use 10 points as processing subjects, and the rest of calculations of 30 times may use all the points as processing subjects. In the present system, such devises make it possible to achieve efficient processes.

Further, based upon the results of the iterative calculations at step S336, data processing unit 52 finds coordinate conversion information that makes the distance between the face found by the measurements and the face based upon the known data smaller (step S338). The coordinate conversion information includes a rotation-shifting matrix for carrying out rotation-shifts and a translation shifting matrix for carrying out translation shifts. By finding this coordinate conversion information, the coordinate position of the face found by the measurements is made to come closer to the position of the face based upon the theoretically correct known data.

Further, the sequence returns to the flow chart of FIG. 20, and proceeds to S318 where data processing unit 52 makes a determination as to whether or not the conversion information found through the process of step S316 can be used for carrying out coordinate conversion with not less than predetermined precision. More specifically, a determination is made as to whether or not the distance between the corresponding faces between the measured data and the known data becomes not more than a predetermined threshold value, as a result of the reciprocal calculations in the process of step S316, and for example, in the case when even one of the distances between the two faces exceeds the threshold value, an error process is carried out (step S320).

In the error process, processes, such as an error displaying process given on the display of data processing device 50, are carried out so that the user is allowed to know that the third data calibrating process has not been completed normally. In this case, the sequence of the first data calibrating process (step S1) is resumed.

In contrast, when the determination at step S318 shows that not less than predetermined precision has been achieved, the sequence proceeds to step S322, and the data processing unit 52 finds a composite conversion parameter between the conversion information found at step S316 and the second conversion parameter found in the second data calibrating process (step S2), and the composite conversion parameter is determined as a high-precision conversion parameter (third conversion parameter). This high-precision conversion parameter is also set for each rotation angle of rotation stage 30 with respect to the three-dimensional measuring devices.

Then, the three-dimensional measuring device and the rotation angle are made in association with each other, and the high-precision conversion parameter is stored in storing unit 53 of data processing device 50 (step S324), thereby completing the third data composing process.

In the case when a plurality of three-dimensional measuring devices are used for measuring the measuring subject to generate three-dimensional shape data, the measured data, obtained by measuring the measuring subject by the three dimensional measuring devices, is generally subjected to a composing process based upon the above-mentioned ICP algorithm, etc.; however, such a processing mode requires time-consuming composite calculation processes each time the measuring subject is measured, with the result that it takes long time to find the three-dimensional shape data. In the present embodiment, the calibration-use subject 90 is preliminarily measured to find high-precision conversion parameters used for composing the measured data from the three-dimensional measuring devices 10, 20 with high precision; therefore, when the measuring subject is measured, it is not necessary to provide repeated calculations carried out by the ICP algorithm, etc. so that only the conversion of the measured data by the use of high-precision parameters makes it possible to achieve a high-precision composite state of the measured data obtained from the respective three-dimensional measuring devices 10, 20; therefore, it is possible to shorten the time taken until the generation of the three-dimensional shape data after the measurements.

Moreover, in the ICP algorithm for positioning two measured shapes, for example, when two pieces of three-dimensional shape data are obtained, an overlapping portion is extracted, and calculations are carried out so as to reduce the difference between the pieces of data (the distance between a point and the corresponding point). However, in the present embodiment, the three-dimensional shapes obtained from the respective three-dimensional measuring devices 10, 20 are compared with given known data, and calculations are carried out so as to make the three-dimensional shapes closer to the given known data so that, in comparison with general cases, it becomes possible to find conversion parameters with higher precision that can make the shapes closer to the theoretical state. In other words, in the third data calibrating process (step S3), the respective three-dimensional measuring devices 10, 20 measure the calibration-use subject 90 having a plurality of planes, and a composing process which makes the measured data, obtained from the respective three-dimensional measuring devices 10, 20, closer to the known data of the calibration-use subject 90, and based upon the results of the composing process, high-precision conversion parameters are found so that it becomes possible to preliminarily find high-precision conversion parameters that can make the results of the measurements closer to the theoretical values.

Moreover, the measured data from the respective three-dimensional measuring devices 10, 20 contain information related to the measuring magnification; therefore, even when the respective three-dimensional measuring devices 10, 20 measure the calibration-use subject 90 and the measuring subject with different measuring magnifications, the magnification of the measured data can be adjusted in accordance with the measuring magnification so that there is no degradation in the composing precision.

Furthermore, since the high-precision conversion parameter is a parameter including the second conversion parameter obtained in the second data calibrating process (a composite between the world coordinate system conversion and the rotation conversion), the first and second conversion parameters are no longer required once the high-precision conversion parameter is found.

Here, in the above explanation, the third data calibrating process (step S3) is arranged on the assumption that the first and second data calibrating processes (steps S1, S2) are carried out; however, the present embodiment is not intended to be limited by this arrangement. For example, the assembling positions, orientations, etc. of the respective three-dimensional measuring devices 10, 20 are obtained from known data of measuring device 2, and based upon the known data, the measured data may be converted to three-dimensional coordinate values of the world coordinate system, and the conversion parameter which is used for making the three-dimensional coordinate values closer to the set value of the calibration-use object 90 is then found. Here, in the case when the first and second data calibrating processes are not carried out, the assembling positions and the orientations of the respective three-dimensional measuring devices 10, 20 tend to deviate greatly from the set values and cause a failure in finding the conversion parameter of the measured data correctly; therefore, it is preferable to carry out the third data calibrating process (step S3) after the first and second data calibrating processes (step S1, S2) have been carried out as described above.

Thus, the data calibrating process (see a flow chart of FIG. 8), which is preliminarily carried out by three-dimensional shape measuring system 1 before the measuring subject has been measured, is completed. Upon completion of all the processes shown in the flow chart of FIG. 8, conversion parameters, which are used for generating three-dimensional shape data from the measured data obtained by measuring the measuring subject while rotating rotation stage 30, are obtained, and the conversion parameters are stored in storing unit 53 of data processing device 50.

By preliminarily finding these conversion parameters before the measurements of the measuring subject, it is possible to improve the efficiency of the process at the time of generating the three-dimensional shape data by measuring the measuring subject by using three-dimensional shape-measuring system 1, and also to make the generated three-dimensional shape data more accurate.

Moreover, measuring device 2 of three-dimensional shape-measuring system 1 is arranged so that the measuring subject is less susceptible to shadowed portions that make the measuring process difficult; therefore, it is possible to provide high-precision, complete three-dimensional shape data by measuring the measuring subject by using three-dimensional shape-measuring system 1.

3. Measuring Operations of Measuring Subject

The following description will discuss measuring operations carried out on the measuring subject in three-dimensional shape-measuring system 1. Here, it is assumed that prior to these measuring operations, the above-mentioned data calibrating processes have been carried out.

Figure 22:
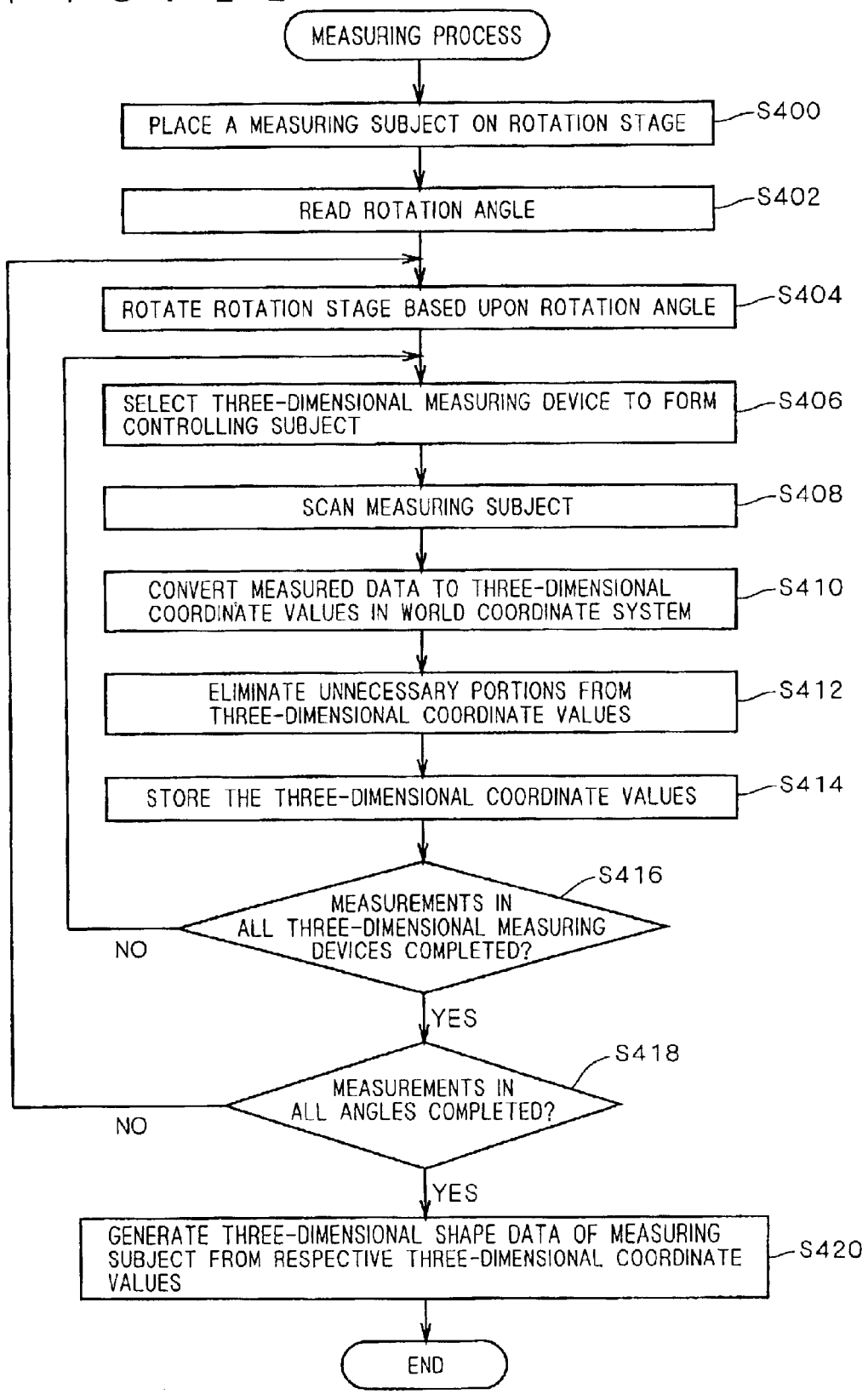
FIG. 22 is a flow chart showing a processing sequence of a measuring process in the three-dimensional measuring system.

FIG. 22 shows a flow chart that shows a processing sequence of measuring processes in three-dimensional shape-measuring system 1.

First, a measuring subject having an arbitrary surface shape is placed on rotation stage 30 (step S400). When the user gives an instruction for measuring operations, data processing unit 52 reads a rotation angle (control angle) preliminarily set so as to rotation-control rotation stage 30 from storing unit 53 (step S402). Thus, when three-dimensional shape-measuring system 1 measures a measuring subject from all directions, it becomes possible to identify what degrees rotation stage 30 should be rotated at for each rotation process so as to measure the measuring subject. Then, control unit 51 gives a control signal to rotation stage 30 so that the rotation stage 30 is rotated by a rotation angle that corresponds to the rotation angle thus read (step S404).

Data processing device 50 selects a three-dimensional measuring device to be controlled from three-dimensional measuring devices 10, 20 to specify the three-dimensional measuring device to carry out measuring operations (step S406). For example, at first, the first three-dimensional measuring device 10 is selected as a controlling subject.

Data processing device 50 allows the selected three-dimensional measuring device to scan the measuring subject so that the reading operation of the surface shape of the measuring subject is carried out (step S408). Data processing unit 52 converts the measured data obtained from the three-dimensional measuring device to three-dimensional coordinate values in the world coordinate system (step S410). More specifically, based upon the three-dimensional measuring device forming the controlling subject and the current rotation angle of rotation stage 30, data processing unit 52 reads high-precision conversion parameters that have been obtained from the third data calibrating process (step S3) from storing unit 53, and converts the measured data to coordinate values in the world coordinate system that correspond to the current rotation angle by using the high-precision conversion parameters thus read.

Then, data processing unit 52 eliminates unnecessary portions from the three-dimensional coordinate values thus generated (step S412). If there is any object in an area on which laser slit light is directed, three-dimensional measuring devices 10, 20 generate measured data with respect to the object. For this reason, the three-dimensional shapes, such as rotation stage 30, included in three-dimensional shape-measuring system 1 are also included in the measured data. Since such data does not have a shape of the measuring subject, it is eliminated from the three-dimensional coordinate values as the unnecessary portions. The unnecessary portions are specified by, for example, the equation related to the upper face of rotation stage 30 found in step S214 in the flow chart of FIG. 17 so that the unnecessary portions are eliminated by nullifying the three-dimensional coordinate values located at positions lower than the upper face of rotation stage 30. Moreover, in another method, the upper face of rotation stage 30 in the world coordinate values is assumed from the set values of measuring device 2, and portions located on the side lower than the upper face position may be eliminated. As a result, the three-dimensional coordinate values found from the measured data are allowed to include only data related to the measuring subject.

Thus, the three-dimensional coordinate values from which the unnecessary portions have been eliminated are allowed to form three-dimensional shape data relating to only the measuring subject at the current rotation angle, and the three-dimensional shape data is stored in storing unit 53 of data processing device 50 (step S414).

Data processing device 50 makes a determination as to whether or not all the three-dimensional measuring devices have measured the measuring subject in a state with the current rotation angle of rotation stage 30 (step S416). In the state where the measurements in the first three-dimensional measuring device 10 have been completed, the sequence returns to step S406 to select the second three-dimensional measuring device 20 as the controlling subject. Upon completion of the measuring operations of the second three-dimensional measuring device 20, after the unnecessary portions have been eliminated from the three-dimensional coordinate values, the resulting data is stored in storing unit 53, and at step S416, a determination is made as "YES".

Data processing device 50 makes a determination as to whether or not the measuring subject has been measured at all the rotation angles (step S418). In other words, a determination is made as to whether or not three-dimensional data has been generated with respect to all the circumference of the measuring subject, and if "NO", the sequence returns to step S404, and rotation stage 30 is rotated so that the measuring subject is measured by the respective three-dimensional measuring devices 10, 20 from another angle to generate three-dimensional data (steps S406 to S416). For example, in the case when the rotation angle at the time of driving control of rotation stage 30 is set at 90°, the loop processes of steps S404 to S418 are repeated 4 times so that virtually all the circumference of the measuring subject is formed into data.

Upon completion of the measuring operations of the measuring subject with respect to all the rotation angles, data processing unit 52 reads the three-dimensional coordinate values (partial three-dimensional data) obtained from the respective three-dimensional measuring devices 10, 20 for each rotation angle, and adds these values to generate three-dimensional shape data related to the entire measuring subject, thereby storing the resulting data in storing unit 53 (step S420). As a result, the three-dimensional shape data related to the surface shape of the measuring subject is stored in storing unit 53 of data processing device 50, and this is outputted to another external device, if necessary.

Thus, the processes of the measuring operations of the measuring subject in three-dimensional shape-measuring system 1 are completed; however, in the measuring operations, upon converting the measured data to three-dimensional coordinate values in the world coordinate system (step S410), only the data conversion by the use of high-precision conversion parameters obtained from the third data calibrating process (step S3) makes it possible to obtain high-precision three-dimensional coordinate values. Moreover, the application of the high-precision conversion parameters can eliminate the necessity of matching processes of the shapes that require repeated calculations after the measurements of the measuring subject by the respective three-dimensional measuring devices 10, 20, thereby making it possible to provide a high-speed operation.

Moreover, in an attempt of achieving high-speed measuring operations, data processing device 50 may operate and control the respective three-dimensional measuring devices 10, 20 and rotation stage 30 in the following manner.

Figure 23:
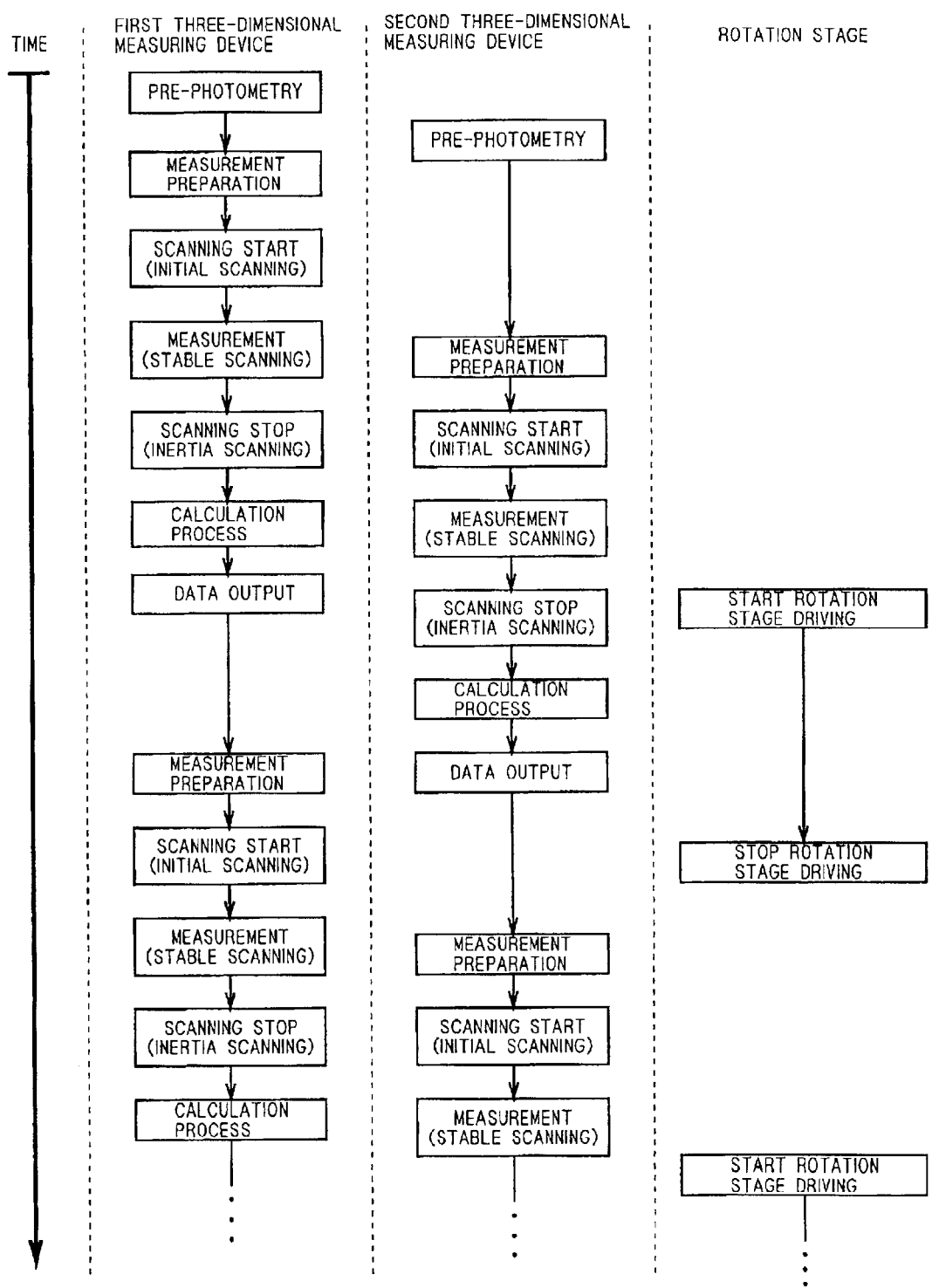
FIG. 23 is a time chart showing a controlling mode used so as to provide a high-speed measuring operation.

FIG. 23 is a time chart that shows a controlling mode to provide high-speed measuring operations. As shown in FIG. 23, in three-dimensional measuring devices 10, 20, upon first measuring the measuring subject, a pre-photometric operation is carried out. After a measuring preparation operation has been carried out, a laser light source is turned on at the scanning start stage, and the initial driving operation for scanning is started. When, upon completion of the initial driving operation, the laser slit light comes to make uniform motion within the scanning range, the measuring operation is carried out. Thus, a stable scanning operation is achieved during the measuring operation. When the measuring operation has been completed, an inertia driving operation is carried out to stop the scanning motion. In this stage, the laser light source is turned off. Then, after the calculation operations in the respective three-dimensional measuring devices 10, 20, the resulting measured data is outputted to data processing device 50.

In the case when virtually all the circumference of the measuring subject is measured while rotating rotation stage 30, data processing device 50 starts driving rotation stage 30, and controls to rotate it at a predetermined angle within a predetermined time.

When the measuring operation from the first three-dimensional measuring device 10 is carried out, the second three-dimensional measuring device 20 is controlled to start a scanning operation when the first three-dimensional measuring device 10 enters a scanning stop stage. With this arrangement, in comparison with the case in which, after the data output stage from the first three-dimensional measuring device 10, the second three-dimensional measuring device 20 is allowed to start the measuring preparation, it becomes possible to improve the efficiency of the measuring operation. In other words, in order to allow the second three-dimensional measuring device 20 to execute the measuring operation (stable scanning) immediately after completion of the measuring operation (stable scanning) of the first three-dimensional measuring device 10, the second three-dimensional measuring device 20 is also operated in parallel with the operation of the first three-dimensional measuring device 10, and while the first three-dimensional measuring device 1 is being operated, the second three-dimensional measuring device 20 is allowed to complete its measuring preparation operation (operation prior to the initial driving stage) so that it becomes possible to provide high-speed measuring operations in three-dimensional shape-measuring system 1.

Moreover, rotation stage 30 is rotated immediately after the completion of the measuring operation of the second three-dimensional measuring device 20, and during the second three-dimensional measuring device 20 is in the inertia driving stage, rotation stage 30 is started to be driven, and preparation is made such that immediately after the completion of the rotation operation of rotation stage 30, the next measuring operation (stable scanning) of the first three-dimensional measuring device 10 is carried out.

In this manner, data processing device 50 operation-controls the first three-dimensional measuring device 10, the second three-dimensional measuring device 20 and rotation stage 30 in parallel with each other, thereby making it possible to carry out efficient measuring operations.

As described above, three-dimensional shape-measuring system 1 shown in the present embodiment, two three-dimensional measuring devices 10, 20 are placed in measuring device 2 so that it is possible to reduce un-measurable portions existing on the measuring subject placed on rotation stage 30.

Moreover, prior to the measuring operations of the measuring subject, the data calibrating process is carried out in three-dimensional shape-measuring system 1 so that data calibration is executed on the measured data measured by two three-dimensional measuring devices 10, 20; thus, three-dimensional shape data is found in the world coordinate system. Therefore, it becomes possible to find three-dimensional shape data without requiring much time in the data processing when measuring subject is measured.

When the data calibrating process is carried out, various types of calibration-use subjects are used so as to detect planes on the calibration-use subject; therefore, it is possible to carry out accurate data calibration-use operations. Moreover, in the data calibrating process, since high-precision conversion parameters are found so as to compose measured data from three-dimensional measuring devices 10, 20 with high precision, it is not necessary to carry out time-consuming composing processes after the measuring subject has been measured, and it becomes possible to find the measuring subject efficiently.

Therefore, the measuring subject is measured by using three-dimensional shape-measuring system 1 explained in the present embodiment so that virtually the entire surface shape of the measuring subject can be measured, and it becomes possible to find three-dimensional shape data at high speeds with high precision.

4. Modified Embodiment

Explanations have been given of the embodiments of the present invention; however, the present invention is not intended to be limited by the contents of the above explanations.

For example, in the above-mentioned embodiments, two three-dimensional measuring devices 10, 20 are placed;

however, the present invention is not intended to be limited by this arrangement, and three or more three-dimensional measuring devices may be placed. As the number of the three-dimensional measuring devices increases, un-measurable portions on the measuring subject are reduced, thereby making it possible to obtain better results of measurements.

Figure 24:
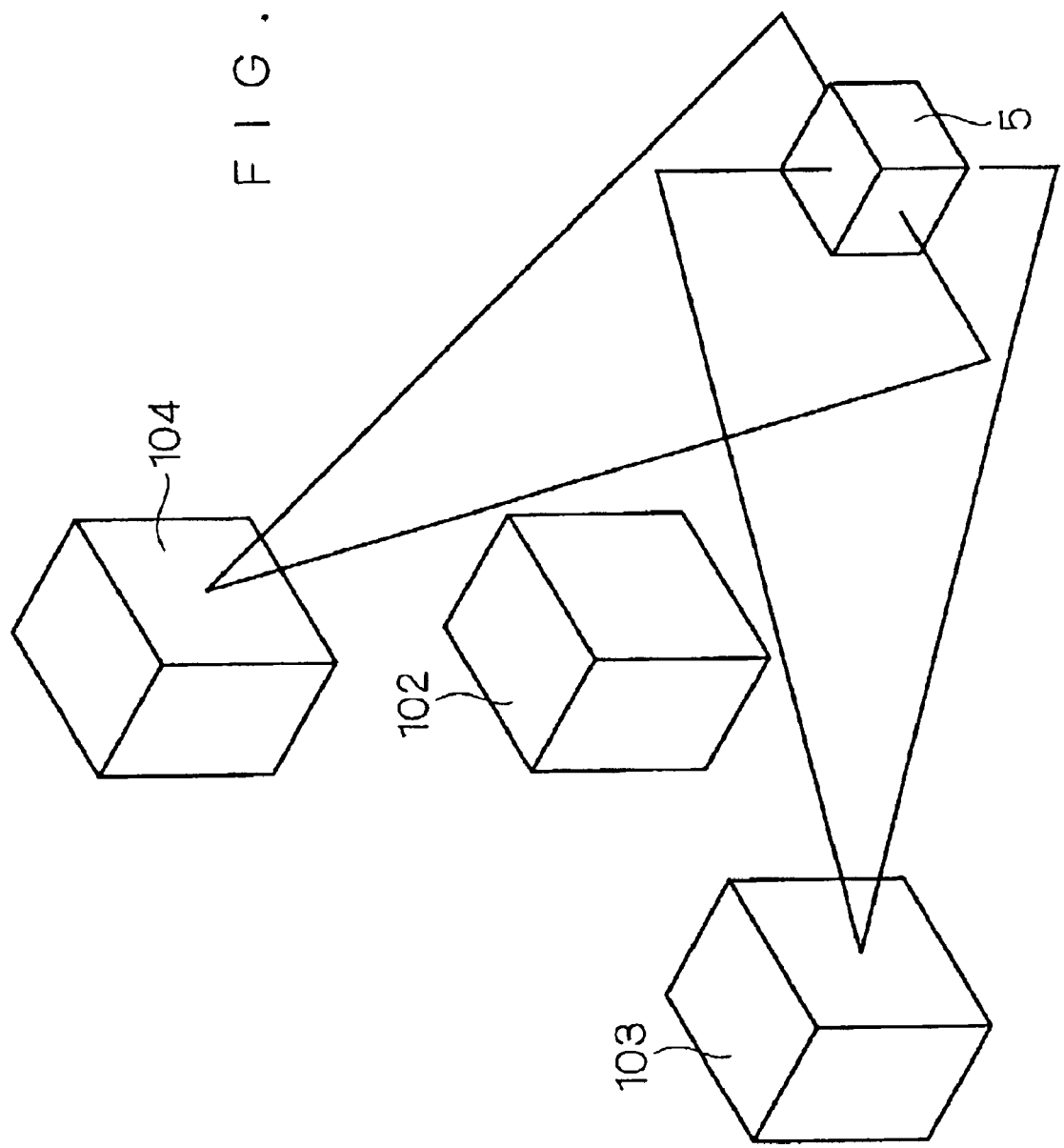
FIG. 24 is a view showing a modified embodiment of a construction of a light-projecting unit and a light-receiving unit.
Figure 25:
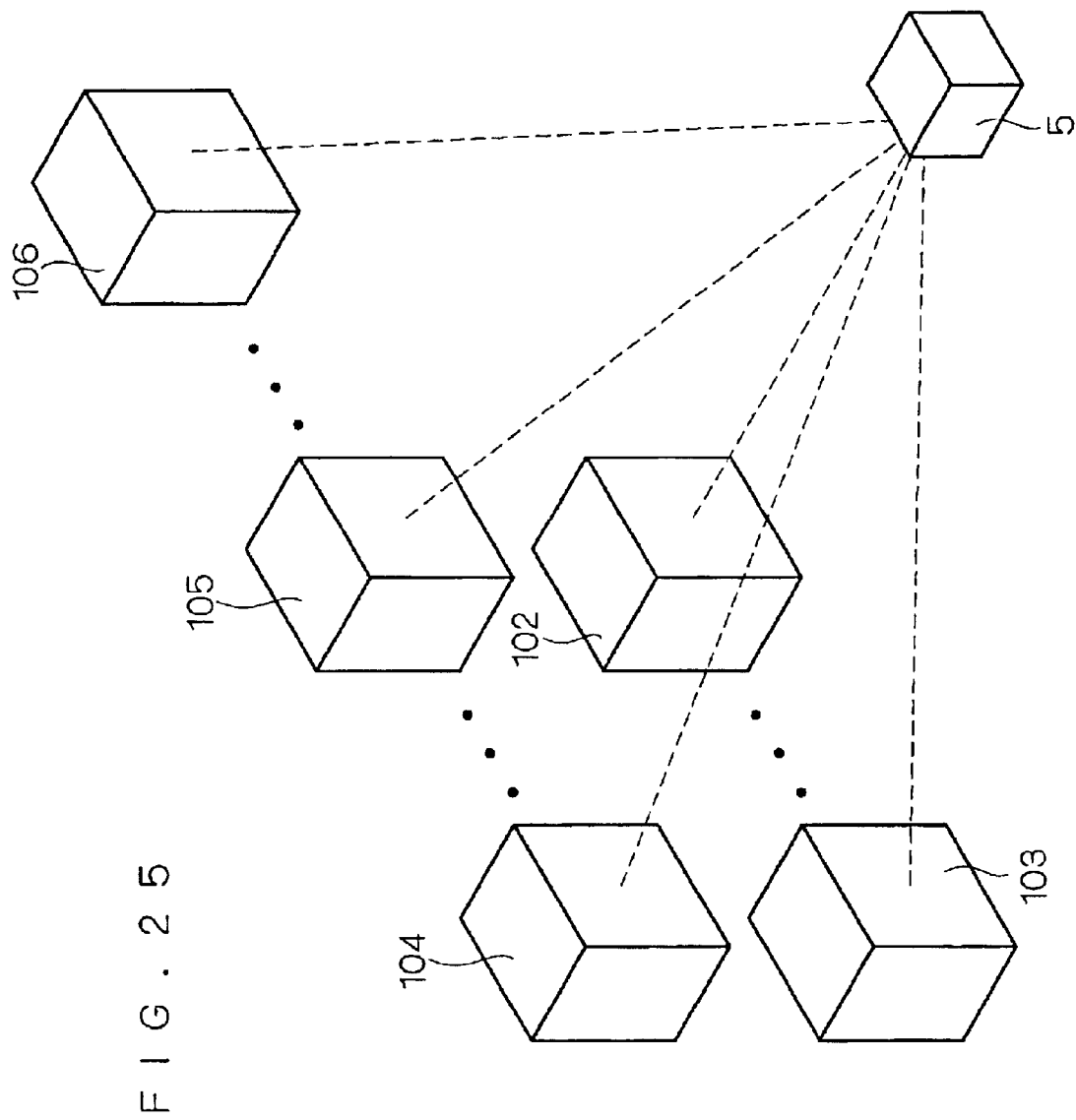
FIG. 25 is a view showing a modified embodiment of the construction of the light-projecting unit and the light-receiving unit.

Moreover, in the above-mentioned embodiments, two three-dimensional measuring devices having similar structures are placed; however, the present invention is not intended to be limited by this arrangement. For example, as shown in FIG. 24, two light-projection units 103, 104 may be placed with respect to a single light-receiving unit 102, and, the light-receiving unit 102 may be arranged to detect reflected light of laser slit light directed from the respective light-projection units 103, 104. This arrangement makes it possible to reduce the number of the light-receiving units to one, thereby providing the system at low costs. Here, in this case also, the directions of the base lengths connecting the respective light-projection units 103, 104 and light-receiving unit 102 are preferably set in different directions. Moreover, in this case, the number of the light-projection units is not intended to be limited by two. FIG. 25 shows an example in which a plurality of light-projection units 103 to 106 are placed with respect to a single light-receiving unit 102, and in this case also, the directions of the base lengths connecting the respective light-projection units 103 to 106 and light-receiving unit 102 are preferably set in respectively different directions.

Furthermore, not a plurality of three-dimensional measuring devices, but a single three-dimensional measuring device may be used. In other words, a single three-dimensional measuring device is placed at a first position, and after measuring a calibration-use subject or a measuring subject from the first position, the single measuring device is shifted to a second position so as to measure the calibration-use subject or the measuring subject from the second position. In this case, since the three-dimensional measuring device needs to be frequently shifted, it is necessary to increase the attaching precision to the first position and the second position.

Here, in the above-mentioned embodiments, rotation stage 30 is placed in measuring device 2, and the entire circumference of the measuring subject is measured; however, in such a case in which only the front face side of the measuring subject is measured, rotation stage 30 is not necessarily required.

While the invention has been shown and described in detail, the foregoing description is in all aspects illustrative and not restrictive. It is therefore understood that numerous modifications and variations can be devised without departing from the scope of the invention.

What is claimed is:

1. A three-dimensional shape-measuring system, which directs laser light to a measuring subject placed in a measuring space from a plurality of directions by using a light projector so that a light receiver detects reflected light derived from said laser light from said light projector reflected by said measuring subject to generate a three-dimensional shape data of said measuring subject, comprising:

a controller which, prior to measurements on said measuring subject, controls said light projector and said light receiver so as to measure a calibration-use subject placed in said measuring space from said plurality of directions;

a data processor which finds a conversion parameter used for converting measured data related to said calibration-use subject, obtained respectively in said plurality of directions, to three-dimensional shape data in a world coordinate system; and a memory storing said conversion parameter; wherein said three-dimensional shape data is generated by data-converting said measured data related to said calibration-use subject, obtained respectively in said plurality of directions, by the use of said conversion parameter.

2. The three-dimensional shape-measuring system according to claim 1, wherein, said data processor finds a conversion parameter used for calibrating relative position and orientation when measuring operations are carried out respectively in said plurality of directions.

3. The three-dimensional shape-measuring system according to claim 1, further comprising:

a rotation stage which rotates said measuring subject located in said measuring space, wherein said data processor finds the position of the rotation axis of said rotation stage from measured data related to said calibration-use subject obtained respectively in said plurality of directions to find a conversion parameter used for rotation-shifting measured data around said rotation axis.

4. The three-dimensional shape-measuring system according to claim 1, wherein, said data processor finds a conversion parameter used for composing measured data related to said calibration-use subject obtained respectively in said plurality of directions.

5. The three-dimensional shape-measuring system according to claim 4, wherein, said data processor finds a conversion parameter which compares measured data related to said calibration-use subject obtained respectively in said plurality of directions with known data of said calibration-use subject to make said measured data closer to said known data.

6. The three-dimensional shape-measuring system according to claim 1, wherein, said measured data contains information related to measuring magnifications used when measuring operations are carried out respectively in said plurality of directions, and said data processor processes said measured data in accordance with said measuring magnifications.

7. A three-dimensional shape-measuring method, which directs laser light to a measuring subject placed in a measuring space by using a light projector so that a light receiver detects reflected light reflected by said measuring subject to measure said measuring subject in a plurality of directions by using a measuring device for measuring a three-dimensional shape of said measuring subject, thereby generating three-dimensional shape data of said measuring subject on the basis of measured data obtained respectively in said plurality of directions, comprising the steps of:

(a) placing a calibration-use subject in said measuring space prior to measurements on said measuring subject;

(b) measuring said calibration-use subject in said plurality of directions by using said measuring device;

(c) finding a conversion parameter used for converting measured data related to said calibrating-use subject, obtained respectively in said plurality of directions, to three-dimensional shape data in a world coordinate system;

(d) storing said conversion parameter; and (e) upon measuring said measuring subject, generating three-dimensional shape data of said measuring subject by data-converting said measured data related to said measuring subject, obtained respectively in said plurality of directions, by the use of said conversion parameter.

8. The three-dimensional shape-measuring method according to claim 7, wherein said step (c) includes the step of finding a parameter used for calibrating relative position and orientation when measuring operations are carried out respectively in said plurality of directions, thereby finding said conversion parameter.

9. The three-dimensional shape-measuring method according to claim 7, wherein said step (a) includes the step of placing said calibration-use subject on a rotation stage provided in said measuring space, said step (b) includes the step of rotating said rotation stage, and said step (c) includes the step of finding the position of the rotation axis of said rotation stage from said measured data related to said calibration-use subject obtained respectively in said plurality of directions to find a parameter used for rotation-shifting said measured data around said rotation axis, thereby finding said conversion parameter.

10. The three-dimensional shape-measuring method according to claim 7, wherein said step (c) includes the step of finding a parameter used for composing said measured data related to said calibration-use subject obtained respectively in said plurality of directions, thereby finding said conversion parameter.

11. The three-dimensional shape-measuring method according to claim 10, wherein said step (c) includes the step of finding a parameter which compares said measured data related to said calibration-use subject obtained respectively in said plurality of directions with known data of said calibration-use subject to make said measured data closer to said known data, thereby finding said conversion parameter.

12. The three-dimensional shape-measuring method according to claim 7, wherein said measured data related to said calibration-use subject contains information related to measuring magnifications used when measuring operations are carried out respectively in said plurality of directions, and said step (c) includes the step of processing said measured data in accordance with said measuring magnifications, thereby finding said conversion parameter.

* * * * *